Figure 2:
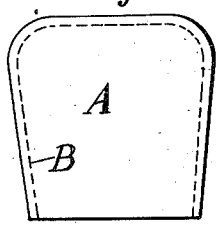

Nov. 9, 1948. A. G. GILBERT ET AL 2,453,623
INFOLDING METHOD AND MACHINE

Filed June 2, 1945 8 Sheets-Sheet 1

INVENTORS:
Alfred G. Gilbert &
William H. Rogers Jr.
BY Morrison, Kennedy & Campbell
ATTORNEYS.

Nov. 9, 1948.  A. G. GILBERT ET AL  2,453,623
INFOLDING METHOD AND MACHINE
Filed June 2, 1945  8 Sheets-Sheet 2
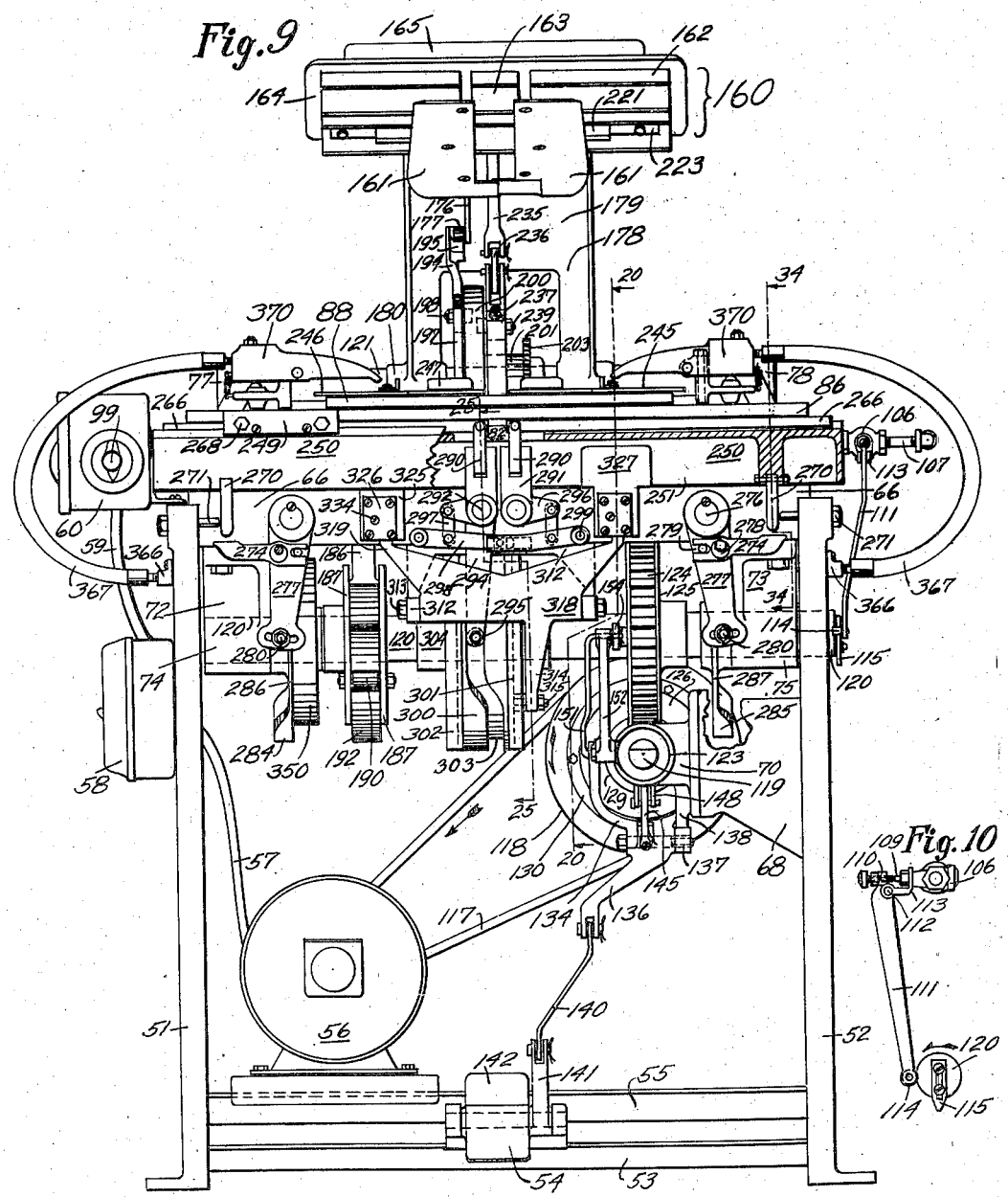
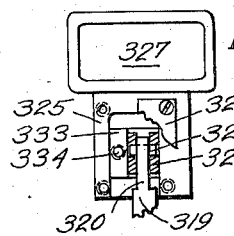
INVENTORS:
Alfred G. Gilbert &
William H. Rogers Jr.
BY Morrison, Kennedy & Campbell
ATTORNEYS.

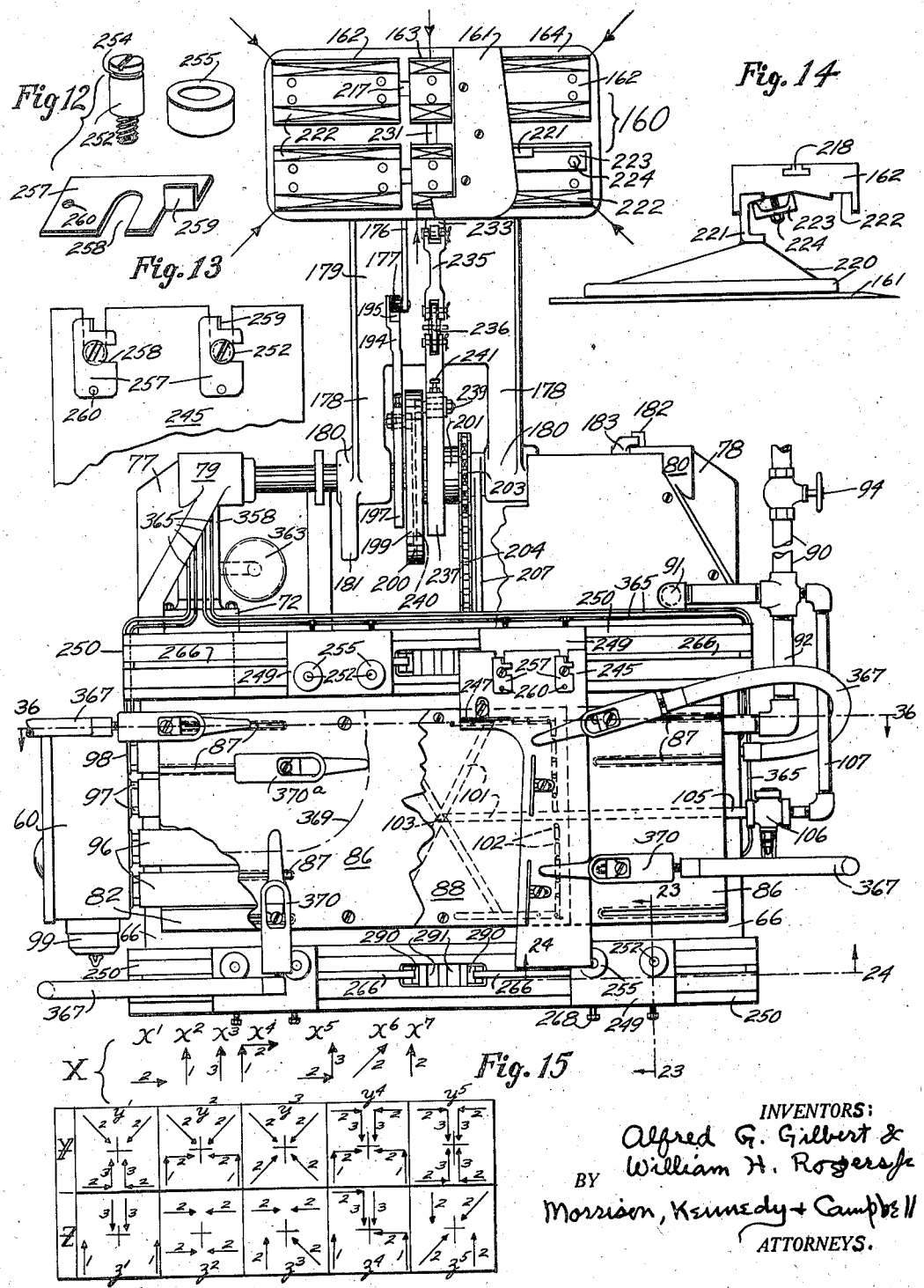

Nov. 9, 1948.  A. G. GILBERT ET AL  2,453,623
INFOLDING METHOD AND MACHINE
Filed June 2, 1945  8 Sheets-Sheet 4

INVENTORS:
Alfred G. Gilbert &
William H. Rogers Jr.
BY Morrison, Kennedy & Campbell
ATTORNEYS.

Nov. 9, 1948.　　A. G. GILBERT ET AL　　2,453,623
INFOLDING METHOD AND MACHINE
Filed June 2, 1945　　8 Sheets-Sheet 5
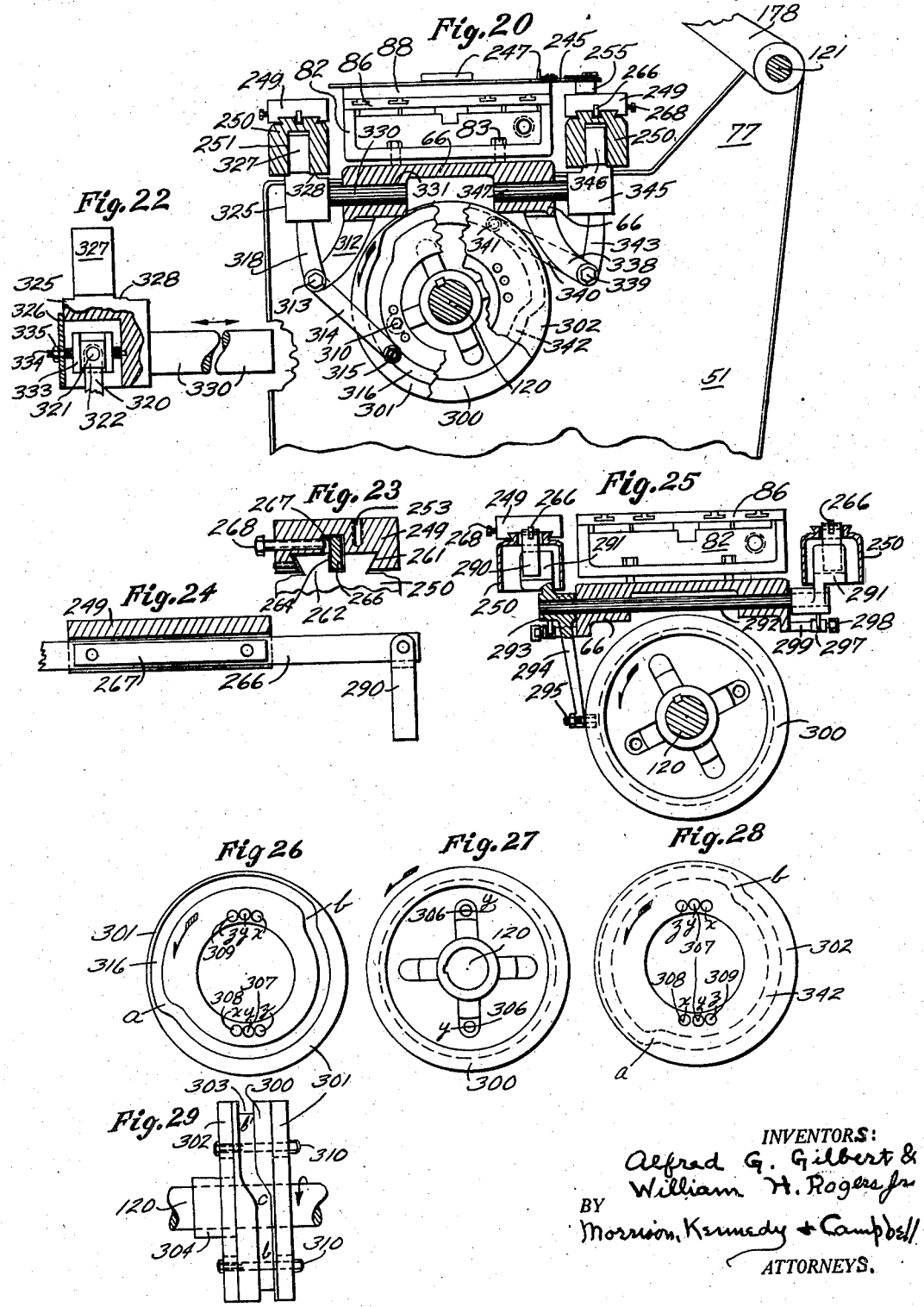

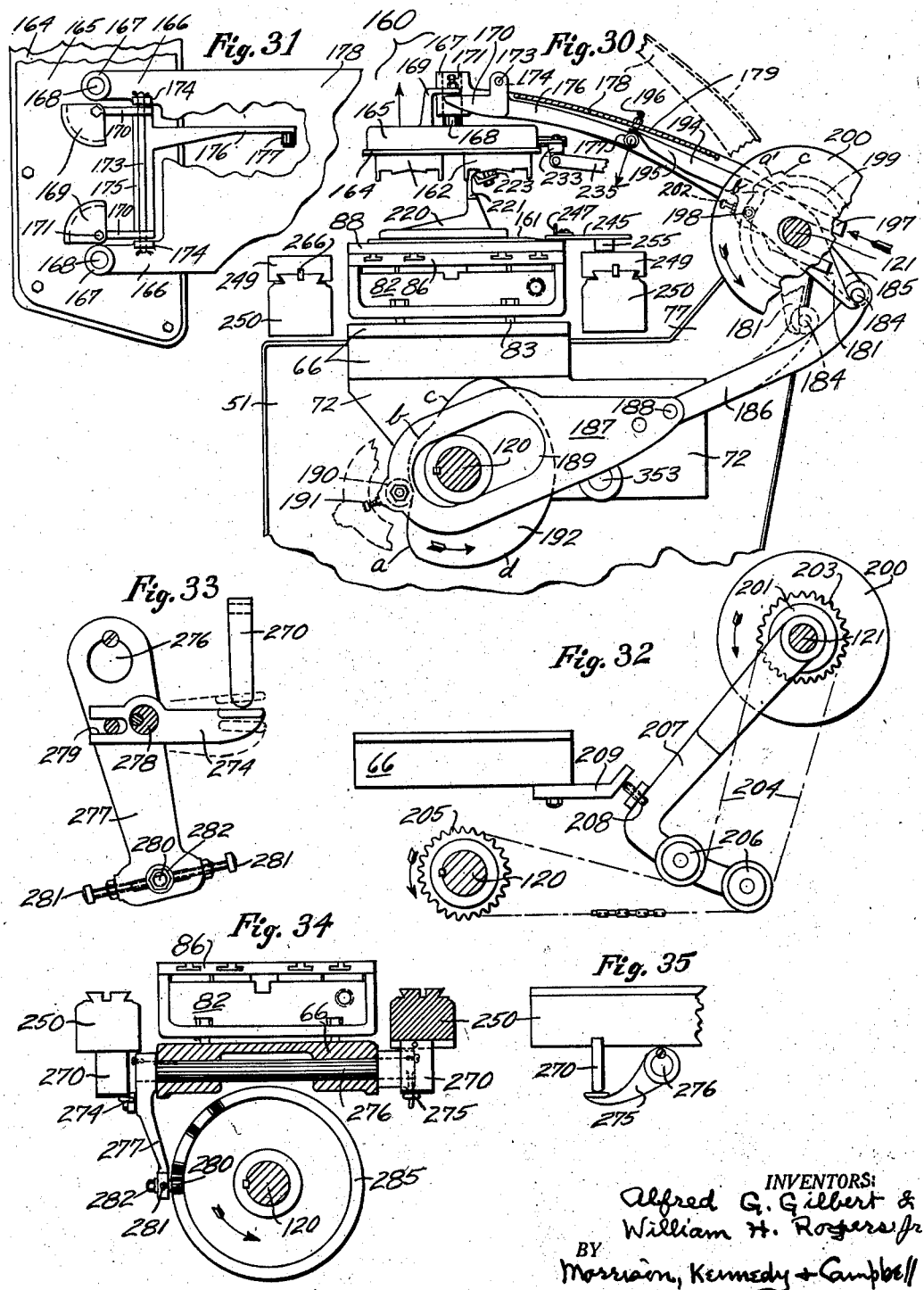

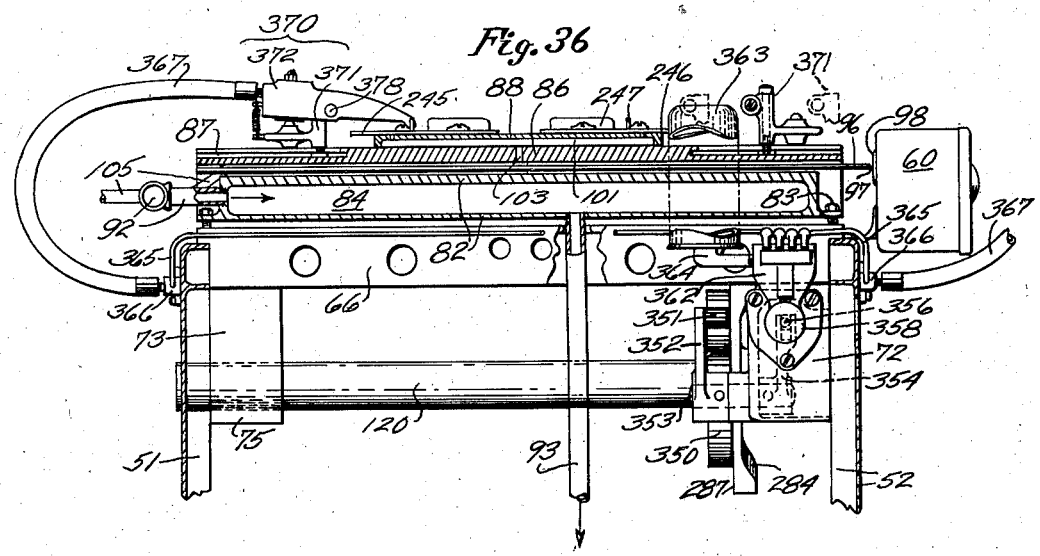
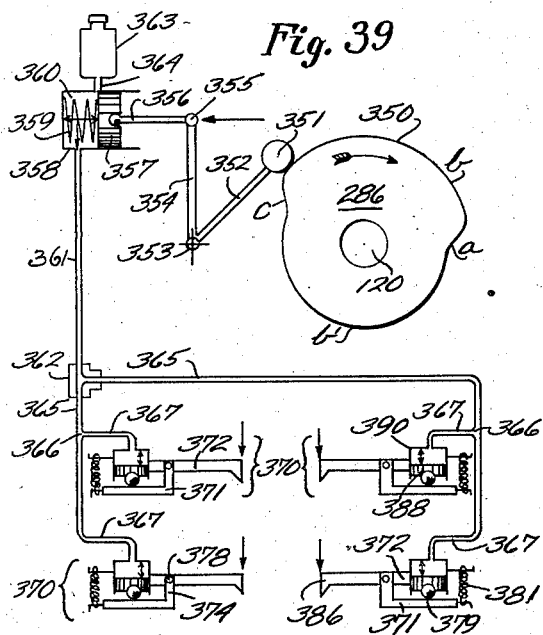
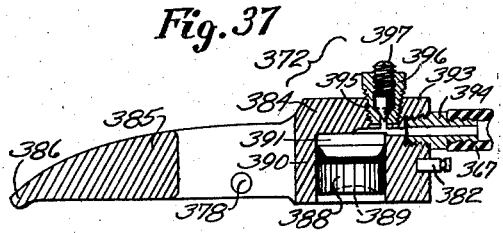
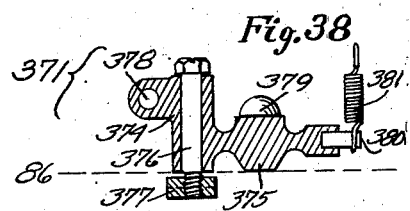

Nov. 9, 1948.    A. G. GILBERT ET AL    2,453,623
INFOLDING METHOD AND MACHINE
Filed June 2, 1945    8 Sheets-Sheet 8
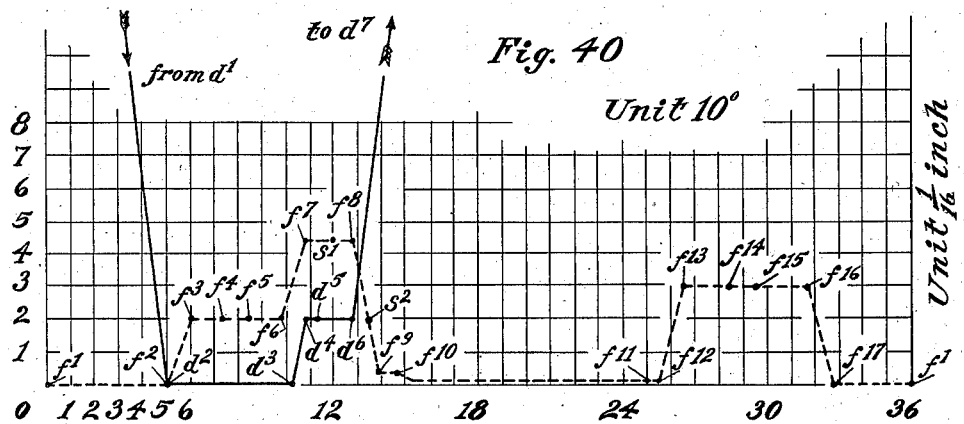
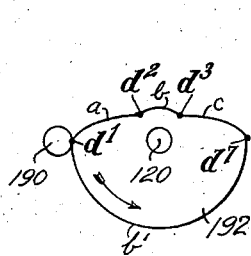
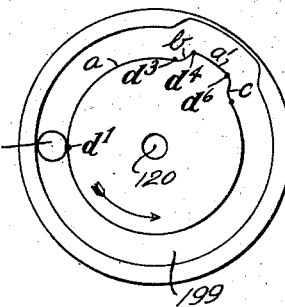
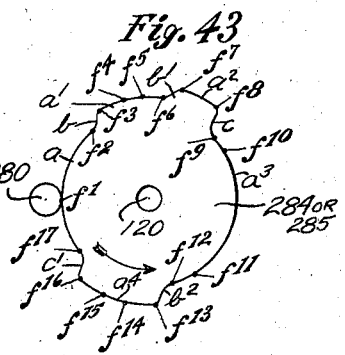
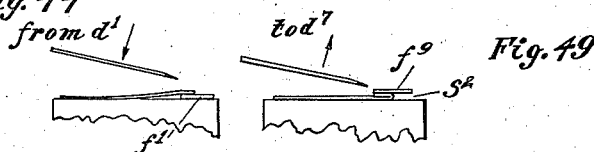
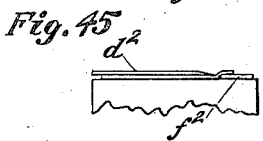
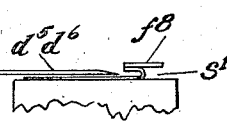
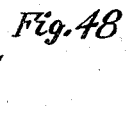
INVENTORS:
Alfred G. Gilbert &
BY William H. Rogers Jr.
Morrison, Kennedy & Campbell
ATTORNEYS.

Patented Nov. 9, 1948

2,453,623

UNITED STATES PATENT OFFICE 2,453,623

INFOLDING METHOD AND MACHINE

Alfred G. Gilbert, South Acton, and William H. Rogers, Jr., Malden, Mass., assignors to Reece Folding Machine Company, East Cambridge, Mass., a corporation of Maine Application June 2, 1945, Serial No. 597,190

44 Claims. (Cl. 223—38)

This invention is a novel infolding method and machine, of the class used for the folding in of the margins and pressing of the folds of blanks of cloth, fabric, leather or similar limp sheet material. Such machines are used largely for the preparing of blanks to form parts of articles of wearing apparel, as collars and cuffs, shirt neckbands, pockets and pocket welts, of cotton, linen, silk or like goods, or sometimes the more difficult woolen suitings; also shoe uppers of fabric, composite material or leather; also pocketbooks and various other cases and novelties and similar goods. It is desirable and economical also to make many kinds of special articles or parts with the aid of margin folding machines, power driven and automatic or semi-automatic, among which may be mentioned the pads or end pieces of garters, the covers of books, the stars of flags, the jackets of baseballs, the pockets of cartridge belts and like equipment, and certain parts of gas masks.

For such a wide range of utility of infolding machines it has been customary, and expensive both to the maker and user, to design specially the machines for the respective uses, involving the keeping in stock of many varieties of parts besides the costs of patterns and other factors; and it is one of the main objects of the present invention to provide an infolding machine which will be of substantially wider usefulness and readily adjustable, either in manufacture or in use, to various different purposes, thus enabling the maker to supply demands without maintaining a numerous line of different models. The machine of this invention is of markedly greater universality of utility than are known machines of the same class; although naturally some adjustments and interchanges must be made, especially of the defining parts of the dies or templets and the folding parts of the infolding means, when adaptations to special shapes of blank are necessary.

Other important objects include true and accurate operation giving uniformly perfect results; durable reliability of action; high speed and output; convenience of control and ready adjustability and interchange of parts when needed.

A special object is to improve materially the coordination of the actions of the defining die or templet and the folders or infolding elements upon the successive blanks to the end that the defining and infolding functions may be better performed, more reliably and without displacement of the work; and improving also the following function of pressing or squeezing the folds to crease and fix them, usually under heat.

Another special object is to improve the operation of pressing or squeezing and fixing the folds by an effective power-operated means, operating by depressing the infolders, which can be readily and simply adjusted and set for almost any required conditions; being thus substantially universal in practical use.

Other objects are to improve the various operations and movements of the die or templet and its parts and the structure and mountings thereof; and to improve similarly the system of folders or infolders; and to provide an effective means for heating the bed and infolders between which the folds are squeezed and set; also to provide an effective power drive, with cams or timed means coordinating the various motions and actions of the instruments and mechanisms of the machine, with convenient means of control thereof.

Further objects and advantages of the invention will appear in the hereinafter following description of practical embodiments thereof. To the attainment of such objects and advantages the present invention consists in the novel infolding machine and the novel features of method, operation, combination, mechanism and detail herein illustrated or described.

In the existing art are numerous types of infolding machines, such as the well known Reece type, and these conventionally contain certain well established cooperative instruments, coordinated by operating mechanisms, usually power actuated and comprising the following. Centrally accessible is the bed, or the blank supporting portion thereof sometimes referred to as a pad, upon which the successive raw blanks are positioned and from which the completed blanks are removed, manually or by automatic infeeding and outfeeding means. The die or templet is mounted, usually by swinging arms to descend upon the blank upon the bed or pad, for defining the blank folds to be formed; the die after the infolding operation being caused to withdraw or extract from the folds, usually by a bodily contacting or collapsing action, in which case the die before another cycle of operation being caused to expand to its initial or defining condition; the contracting type of die consisting of a shiftable body under which are slidably mounted carrier members or blocks which in turn carry the actual blank-defining plates or blades, usually thin-edged and mounted at the foot of shanks attached to the movable elements of the die. The infolding means comprises at least one, and frequently several infolders, each comprising a body portion and a relatively thin or sharp folder plate, the folder or folders being mounted and operated by mechanism to advance or slide inwardly to effect the folding, and to take part in the pressing, and later to return or retract outwardly, leaving the completed blank upon the bed or pad for outfeeding. With these elements, the basic type of machine comprises also a pressure means, for squeezing the folds of each blank between the bed and the folders before the latter have retracted, preferably by depressing the folders through power connections following the extraction or collapse of the die.

The illustrated embodiment of the present invention comes within the type of infolding machine thus outlined, as do numerous prior machines of the Reece or other types. For illustrative purposes the following U. S. patents are enumerated as indicating various specific uses of the infolding machine principles described. In the field of garments, collar infolding is illustrated in the patent of Gilbert No. 2,108,199 of 1938 showing a machine for folding the edges of a so-called collar top, while the following refer to the folding of collar bands, Dixon and Gilbert No. 1,997,576 of 1935 and Dixon No. 1,883,343 of 1932. A machine designed especially for the folding of cuffs is illustrated in the patent of Dixon No. 956,950 of 1910. An instance of folding pockets for jumpers, overalls etc. is disclosed in Dixon No. 1,753,648 of 1930. Instances of machines for folding small articles such as garter pads are illustrated in the patents of Dixon No. 1,797,641 of 1931 and No. 1,883,345 of 1932. Machines for infolding the edges of blanks of woolen material such as the parts or welts of pockets for men's suits are shown in the patents of Gilbert No. 2,238,048 of 1941 and No. 2,281,970 of 1942. A machine for performing the infolding of blanks for straps to form parts of garments is illustrated in the patent of Dixon No. 1,979,872 of 1934. These are instances of the various kinds of utility of infolding machines generally, and it is a purpose of the present invention to provide a universal type of folding machine readily adaptable to the folding of the recited and other parts and products.

Figure 1:
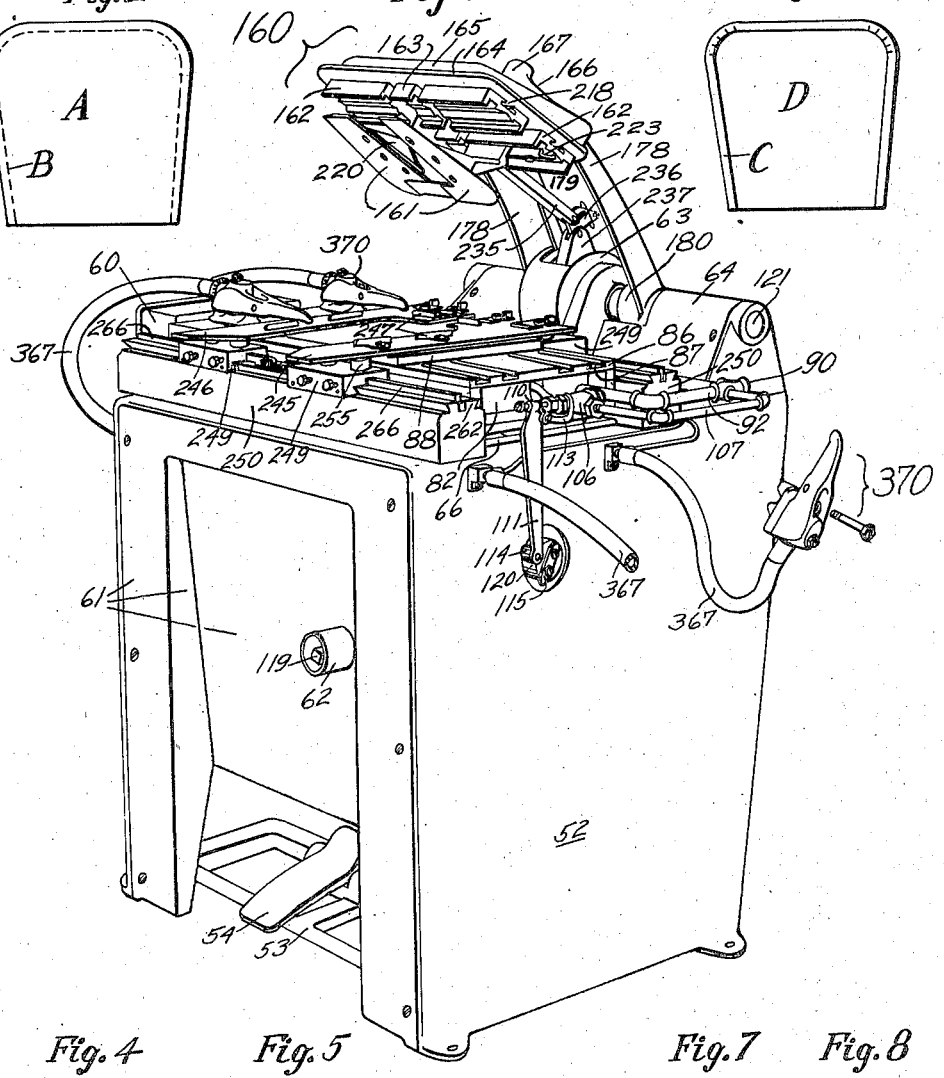
Figure 3:
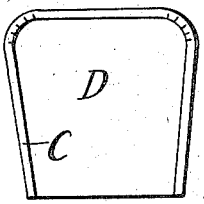
Figure 4:
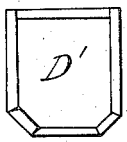
Figure 5:

On the accompanying eight sheets of drawings an illustrative embodiment of the invention is disclosed in the following figures. On Sheet 1, Fig. 1 is a general perspective view of the illustrative machine, with the die or templet in its contracted and upswung position and with the pressure means at the righthand side shown displaced to an outwardly remote place to afford a better view of the infolding mechanism; numerous parts and details being covered and concealed in this figure but illustrated in other figures. Fig. 2 is a face view of a typical cloth blank as cut out to a design corresponding with the outline of the die shown in Fig. 1 and elsewhere, while Fig. 3 shows the same blank in its completed or infolded and pressed condition; a blank of this design being adapted to be used to form a pocket on certain types of garments, such as jumpers. Figs. 4, 5, 6, 7 and 8 show an assortment of other infolded blank forms, among the many different designs for which the illustrated machine may be adaptable.

On Sheet 2, Fig. 9, on a larger scale than Fig. 1, is a front side elevation of the same machine, in greater completeness and detail, and with certain parts broken away to show the structure of other parts beyond, the die being shown in its upswung position. Fig. 10 is a righthand elevation of a detail seen in Figs. 1 and 9 relating to the automatic steam treatment of each infolded blank to assist the pressing of its folds. Fig. 21 is described further below in connection with Figs. 20 and 22.

As a matter of terminology the left and righthand extremities will generally be referred to as the ends of the machine and the front and back as the sides; a motion or direction from left to right or vice versa as longitudinal in a general sense, while fore-and-aft is considered transverse.

On Sheet 3, Fig. 11 is a top plan view of the machine shown in Figs. 1 and 9, with the swinging die shifted up and over rearwardly from its upswung to an idle or inoperative position at the back, thus affording a bottom plan view of the die. Fig. 12 is an exploded view of a detail comprising certain parts constituting the means for securing or clipping a folding plate on the carrier upon which it is mounted to perform its infolding movements; while Fig. 13 is a top plan view showing the same clip means applied in position upon an infolder. Fig. 14 is an elevation showing a detail of the means for mounting one of the defining plates of the die, by its shank, at the underside of its carrier plate. Fig. 15 is a chart of diagrams of various infolder combinations and the in-and-out movements thereof as instances of the varied possibilities of the machine to be described.

Figure 16:
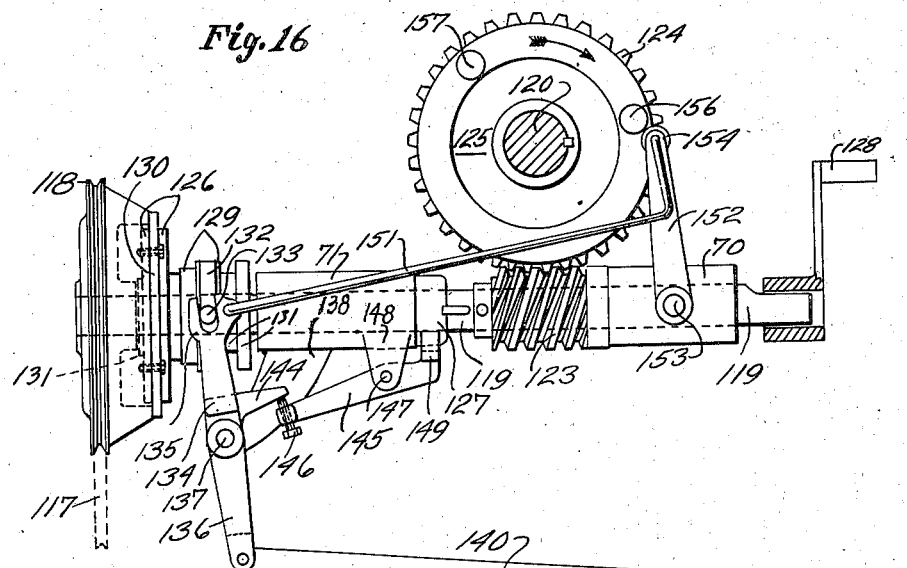
Figure 17:
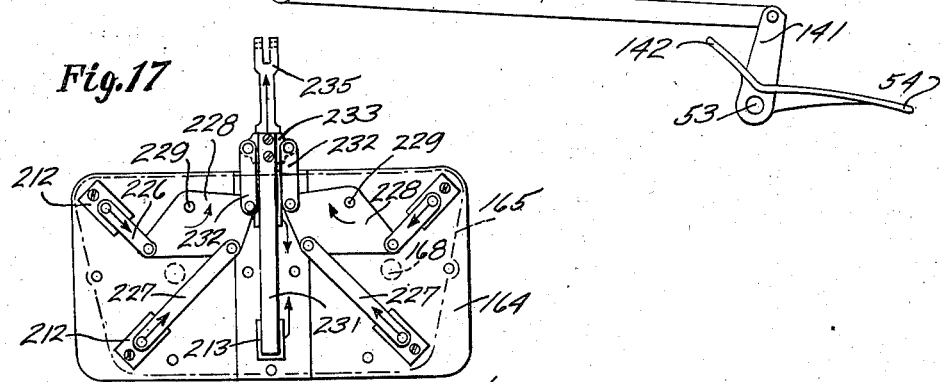
Figure 18:
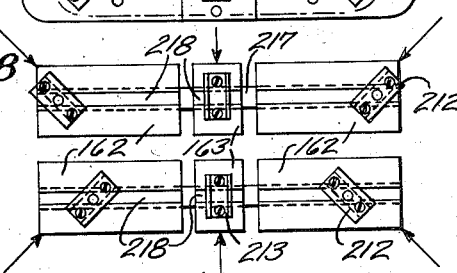
Figure 19:
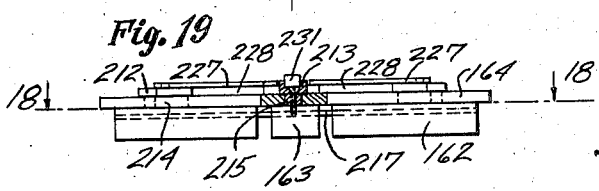

On Sheet 4, Fig. 16 in left elevation shows certain portions of the driving mechanism of the machine including the automatic means for stopping the operation at certain points of time, including an intermediate point and at the end of each cycle. Fig. 17 is a plan view showing certain details of the die construction, including the connections or linkage by which the contracting and expanding movements are distributed to the sliding members which carry the defining plates. Fig. 18 is a similar view of the same taken at the lower level indicated at 18—18 of Fig. 19. Fig. 19 is a front elevation of the same parts of the die; its protecting cover or housing being omitted.

On Sheet 5, Fig. 20, looking from the right is an end elevation taken partly in section on the line 20—20 of Fig. 9, showing the mechanism for actuating the folders to move transversely inwardly and outwardly. Fig. 21 is a front elevation of one of the train of elements shown in Fig. 20; while Fig. 22 is a right hand elevation of the same part. Fig. 23 is a vertical section view of part of the infolder operating connections taken on the section line 23—23 of Fig. 11, looking from the right. Fig. 24 is a front view of certain infolder operating connections shown in vertical section on the line 24—24 of Fig. 11. Fig. 25, referring also to the infolder operating connections, is a vertical section taken on the line 25—25 of Fig. 9, looking from the right. Figs. 26, 27 and 28 are righthand elevations of three rotary disk members respectively which in Fig. 9 are shown assembled in a compact arrangement or cluster; Fig. 29 being a front elevation of this folder cam assembly, seen also in right elevation in Fig. 20, where the figure is broken away in a manner to show portions of all three rotary members.

On Sheet 6, Fig. 30 is a right elevation of a portion of the machine including the bed, the die and one infolder, and the mechanism for effecting both kinds of lifting and lowering movements of the die as performed during each cycle. Fig. 31 is a top view of the die and the means for carrying it for its up and down movements.

Fig. 32 is a right elevation of certain parts shown in Fig. 30 together with the means for driving the upper rear cam thereof. Fig. 33 is a front elevation of part of one of the front infolder lifting means, like that seen near the righthand end of Fig. 9. Fig. 34 is a righthand elevation thereof partly in section on the line 34—34 of Fig. 9. Fig. 35 is a back elevation of the corresponding folder lifting means at the back side of the machine.

On Sheet 7, Fig. 36 is a rear elevation view partly in section on the longitudinal line 36—36 of Fig. 11 showing in part the pressure applying means and related parts of the mechanism; also the steam circuits for the bed chest and spray. Fig. 37 shows a detached one of the presser members or rocklevers of a presser device, in central vertical sectional view, while Fig. 38 is a similar view of the other part of the device, being the supporting or base member upon which the presser member is mounted to tilt for applying and relieving the pressure on the folder. Fig. 39 is a diagrammatic view in elevation of a preferred means for operating hydraulically the several presser members.

On Sheet 8, Fig. 40 is a motion diagram, laid out to show for a single cycle of operation of the machine the various rising and lowering movements of the die and of the infolders, in their preferred relative timing, and indicating also the relation of these movements to certain other main actions of the machine, e. g. the die extraction, the folder in-and-out motions, and the spray and pressure actions. Figs 41, 42 and 43 are diagrams showing the contours of the cams which cause the die and folder lifting and lowering movements, these figures carrying diagram reference characters corresponding to certain of those on Fig. 40. Figs. 44, 45, 46, 47, 48 and 49 are successive diagrams in elevation illustrating the actions of the die and folders upon a blank resting upon the bed, when carried out in accordance with the diagrams of Figs. 40 to 43.

Figure 6:
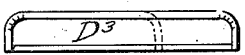
Figures 7, 8:
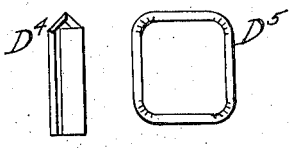

Referring first to the illustrations of certain products which can be made upon the machine hereof, Fig. 2 shows a face view of a cloth or other blank A of the shape for which the illustrated die and folders are designed, with the fold line B indicated in dotted lines. When the margin C is infolded upon the body of the blank and is effectively pressed and creased, preferably with the aid of moisture from steam sprayed into the fabric, the finished blank D results, seen in Fig. 3, in this case of a shape suitable for providing pockets upon various garments. Other illustrative folded blanks comprise the blank D' shown in Fig. 4 suitable for the pocket of a shirt; and blank D², Fig. 5, for a similar purpose. The blank D³ in Fig. 6 is of a shape suitable for a shirt cuff and this figure shows in dotted lines that the illustrated cuff may have greater or lesser length. The blank D⁴ of Fig. 7 is of a form suitable for the facing of a shirt sleeve. Blank D⁵ of Fig. 8 represents a common form of pocket flap.

Referring next to certain of the general parts of the machine, its frame comprises an upright left end wall 51 and a corresponding right frame wall 52, between which much of the operating mechanism is enclosed. At the bottom the end walls are interconnected by a low cross frame 53 near the front supporting the controlling pedal 54, and slightly higher a back cross frame 55 supporting a drive motor 56, which is preferably an electric motor as a convenient means of drive of the machine. Connected with the motor by a cable 57 is an electric switch box 58 which may represent the input or source of current; and this is connected not merely to drive the motor, under suitable switch control but, by a cable 59 to operate an electric heating system through a heater switch box 60, both boxes shown mounted on the left frame wall 51, the character of all of this electric apparatus being conventional and requiring no specific description.

Certain of the apparatus is preferably closed or covered when in commercial use, the covers however being generally omitted throughout the figures, excepting that in Fig. 1 there is shown an upright front cover 61, concealing and protecting most of the interior mechanism, but formed with a sleeved aperture 62 to give access for manual manipulation of a drive shaft to be described. At the back of Fig. 1 is seen also a central cover 63 between two other covers 64, serving to house the rear axle and certain parts mounted thereon.

The general frame, of which the end walls 51 and 52 and the bottom frames 53 and 55 have been mentioned, is substantially completed by a top frame wall or piece 66, extending between and suitably attached to the tops of the end walls 51 and 52, this top frame wall being shown in Figs. 1, 9, 11, 20, 30, 34 and 36, it giving support to numerous parts mounted both above and beneath it. Other substantial fixed members which may be considered part of the frame comprise the following. At the inner side of the right end wall 52 are shown a pair of main brackets 68 at the front and a corresponding bracket, not seen, at the rear, these carrying the bearings 70 and 71, Fig. 16, for the transverse drive shaft 119 to be described, positioned at about half the height of the frame. Other important brackets are the drop brackets 72 at the left and 73 at the right mounted at the under side of the top horizontal frame wall 66, depending therefrom and carrying at their lower ends the left bearing 74 and the right bearing 75 for the longitudinal main or cam shaft 120 to be described. Another pair of brackets 77 at the left rear and 78 at the right rear, shown as integral rear upward extensions of the upright frame walls 51 and 52 are provided in order to carry left and right bearings 79 and 80 for a rear axle or oscillating shaft 121 to be described.

A main central element above the top frame wall 66 is a bed or support 82, constructed hollow to constitute a steam chest for the heating of the central parts above the bed. The bed is shown substantially coextensive with the top frame wall 66 and is mounted thereon by means of bolts 83 in a manner to space the bed slightly above the wall as seen in Fig. 20. In its completeness the bed comprises the hollow chest 82 containing the steam space 84 and overlying the top wall thereof a plate or cover 86, which is of a special structure and receives heat from the bed, transmitting it upwardly to the blank supporting pad 88 thereabove, which in effect is also a supplement to the bed, the blank receiving, defining and folding operations being performed on top of the described series of superimposed elements.

The steam heating of the bed may be effected as follows. The main steam inlet or supply pipe 90 is best seen in Fig. 11, this leading to a T-coupling from which descends a drain connection 91 to eliminate water, while another connection 92 leads directly into the steam space 84 in the bed as best seen in Fig. 36, there being a drain pipe 93 to eliminate condensate from the chest.

This drain pipe may have valve means, not shown, providing a receiving space from which condensate may be discharged methodically or at intervals. The general steam supply pipe 90 may have a shut-off valve 94, usually kept open during operation for supplying steam continuously for the heating of the bed and superimposed parts.

Having described generally the bed, comprising its hollow body or chest 82 and its cover plate 86, which gives support to the blank receiving pad 88, all maintained heated for effective folding, certain details of these elements will now be described, and at the same time a supplemental means of heating by electricity, useful also in cases where steam heating is inconvenient or unavailable. By using both heating means together, plus the blank moistening means or steam spray to be described, a more effective and quicker pressing or creasing is performed upon either ordinary or difficult materials. The metal bed and folders are hotter as also are the steam spray passages. The spray becomes substantially a true vapor free of entrained water, and excessive condensation is avoided when the steam contacts the folders and blank. The spray is needed only at the start of pressing, to break down the fiber resistance to a sharp creasing and it is cut off early; and during continued pressing. The double heating system expedites the driving off of the moisture left in the fabric, ensuring a dry product. By these quickening actions the machine may be speeded and the cycle shortened, resulting in a desirably increased rate of production of blanks with folded edges that remain creased. The electric heat when used may be considered the main source, more intense than that of steam, the steam supply being important mainly for spray purposes, the chest 82 and drain piping aiding in minimizing condensation in the spray lines. The described electric-steam heat is more than a mere convenience; it is a basic factor in enhancing quality and out-put, especially of blanks of difficult fabrics or shapes, rendering the automatic machine fit for replacement of manual folding systems heretofore much employed.

For electrical heating or superheating the upper side of the bed is recessed above the hollow chest 82, in order to provide a flat space to receive the electrical elements; or this space might be provided through depending ribs on the cover plate 86. Accommodated in this flat space between chest and cover are shown a number of electrical heating elements in the form of flat strips 96, as best seen in Fig. 36 and at the left side of Fig. 11. These elongated strips contain resistance circuits, which are encased in an insulating case or coating. Each heating strip has at its left extremity a connecting plug 97, and the several strips, four being shown, are readily inserted into the righthand side of the recess, without any need of disassembling any part of the machine, and thrust longitudinally through into place, with their plugs 97 connected into sockets 98 mounted at the inner side of the electrical heater box 60; the box having a switch 99 by which the current can be thrown into the heaters or cut off at will, or adjusted. The strip type of electrical heating element is conventional and needs no further description, and conventional thermostatic or other means may naturally be installed to control the resulting temperatures, as by current regulation.

The cover plate 86 of the bed is shown as formed with a number of undercut grooves 87 at its top side, seen for example in Figs. 1, 11 and 36, for the reception of the mountings or nuts 377, Fig. 38, of the presser devices to be described, several of which are shown in different arrangements and which can by means of said grooves be located in the most effective places for the depression of the infolder margins to squeeze and fix the blank infolds. As seen in Fig. 36 the pressers mounted in the grooves of the bed cover overreach the infolders which lie above the pad portion of the bed, as will be further described. For unusual conditions a presser device may be located in odd places by drilling and tapping a hole at the top side of the bed cover plate to receive the presser mounting bolts 376, Fig. 38, dispensing with the nut 377.

The pad member 88 of the blank supporting elements is shown as formed with passages, by means of underneath grooves 101, for the distribution of steam to be discharged upwardly or sprayed into the folded fabric of the successive blanks for moistening them to improve the fixing of the folds. These grooves 101 appear in Figs. 11 and 36, and they lead from a central receiving point to points near the periphery whereat the pad is perforated with upwardly directed exits or nozzles 102, suitably located to reach the folded blank fabric well within the periphery thereof. For such purposes the pad may be interchangeable for different shapes to be folded, although a properly designed and perforated pad may serve without change for a great variety of shapes.

For supplying steam to the spray passages of the pad there is shown a common or central uptake passage or pipe 103 leading into the distributing grooves 101, and this uptake passage is supplied by a steam pipe 105 arranged in the recess between the bed chest and cover, for example between two of the electrical heating elements 96 along the longitudinal axis of the machine. The supply of steam under pressure for such moistening purposes is not continuous, but intermittent, under suitable timing; and a spray controlling valve 106 is shown discharging into the pipe 105 and receiving steam by a supply pipe 107 connected with the steam main 90.

The timing and duration of the steam spraying action may be varied, but in each cycle is usually applied as a short blast or puff of steam, admitted by the valve 106, commencing for example about the time the die retracts from the infolded edges of the blank, and continued until about the time the squeezing pressure between infolders and pad is applied. These parts being under a continuous elevated temperature, the cutoff of the steam causes a rapid drying of the parts and of the blank during the effective squeezing and fixing of its folds. For bringing about such controlled spraying actions the valve may be operated under automatic timing substantially as follows.

The valve 106, which is shown of the conventional blow-off or whistle type, normally spring-closed but openable for a brief puff, has its stem 109 spring-retracted to close the valve. For opening it there is shown a short lever arm 110 adapted to press inward the stem when swung by the long tail arm 111 of the lever, the lever being pivoted at 112 on a bracket 113. See Figs. 1, 9, 10 and 11. For timed action the lever long arm is shown carrying a follower 114 which may normally rest upon the righthand end of the main shaft 120 by the spring action but is thrown frontward and promptly let back in each cycle by a cam or shaped lug 115 mounted on the extremity of the shaft and adjustable thereon for the throw of the lever and operation of the valve thereby, and also for the timing thereof relative to the folding and pressing operations upon each blank. The principles of steam dampening or spraying of folded fabric blanks while under squeezing pressure, and quick drying out, were made known in and by the aforesaid patents of Gilbert Nos. 2,238,048 and 2,281,970, to which reference may be had for further disclosure. The steam moistening may be used or not according to the fabric worked on; while the heating may be electrical or by steam, whichever is best for the work in hand, or both simultaneously, as explained.

To refer next to certain general rotary members or rotors, shafts and axles, there is shown, driven by a belt 117 from the motor 56, a power-rotor or pulley 118, turning continuously through cycle after cycle, see Figs. 9 and 16; and next, clutch-driven and declutchable from the power pulley and coaxial therewith, a horizontal drive shaft 119, set transversely and turning in the front and rear bearings 70 and 71, see also Fig. 1; also, gear driven from the power shaft, a horizontal main or cam shaft 120, turning in the left and righthand bearings 74 and 75, and carrying the greater part of the operating and timing cams for the die, the folders, and the pressers, and turning clockwise in left end view. As is customary, a single rotation of the main shaft corresponds with one complete cycle including the defining, folding and pressing of each of a succession of blanks; and the driving and stopping means, with manual control by the pedal 54, is arranged to stop the main shaft at the point corresponding to the end of the cycle, with die, folders and pressers retracted and the completed blank accessible for extraction from the pad and replacement by an unfolded blank; with preferably an intermediate stop also, while the pressure is in effect, giving the opportunity to prolong the hot and moist squeezing of blanks of fractious material or form, as will be described. There is further a reversely rocking shaft or axle 121 above and to the rear of the bed, about which the die swings, and supported in the bearings 79 and 80 on the rear brackets 77 and 78; and other rockshafts or axles including some extending fore-and-aft and turning in the frame top place 66 as a bearing, to be explained in detail.

Referring next to the connections from the power pulley or member 118 to the drive shaft 119 and main shaft 120, the last mentioned receives its slow cyclical rotation from the drive shaft through a worm 123 fast on the drive shaft meshing with a worm gear 124 fast on the main shaft, these constituting a reduction gearing, as does also the belt drive from the motor to the power pulley. The worm gear 124 constitutes the peripheral portion of a disk or web 125 the hub of which is keyed to the main shaft.

The communication of the rotation from the pulley 118 to the drive shaft is through a manually operable clutch which may be of any conventional kind, for example a marketed clutch called the Dodge rolling grip friction clutch No. BP45, which is herein shown. The clutch body 131 is a sleeve fast on the drive or worm shaft 119, being keyed thereto and located axially by a set screw.

Basically the illustrated clutch comprises a rotary disk 130 of friction material floating between a pair of steel disks 126, and these latter are keyed upon the clutch body sleeve fast on the shaft. The outer disks 126 sandwich the middle disk 130 and are fitted to be pressed together to squeeze it between them, creating coupling or clutch friction. The floating middle disk is bolt-connected to the conical web of the pulley 118, and rotates continuously with it, so that when the disk is squeezed by the outer disks the shaft becomes clutched to the pulley.

The drive shaft 119 carries not only the clutch disk 126 but also a braking element shown as a collar 127 fast on the shaft; and the front end of the shaft may be flattened or squared to receive, at will, a crank 128 by which the shaft may be manually turned to put the machine slowly through its cycle.

The operation or shifting of the clutch by which the drive shaft is rotated may be through the following elements. A hub member 129 is shown as mounted loosely on the clutch body in a manner to permit relative rotation and relative sliding. The hub 129 when shifted rearward, leftward in Fig. 16, operates by a characteristic interior mechanism to cause the side disks 126 to approach and squeeze the center disk 130; and this causes the continuous rotation of the disk to be transmitted through the disks 126 to the clutch body and shaft 119. Furthermore the mechanism is such that the hub 129 will remain in its adjusted position whether with the clutch closed or open, without the need either of holding the pedal in the corresponding position or of springs, weights or like holding means, as would be necessary with cone and certain other types of clutch.

In Fig. 16 the clutch is shown engaged, the hub 129 having been shifted rearwardly (leftwardly) as shown, for that purpose, and the foot pedal 54 being in its depressed position. To effect axial sliding of the hub 129 it is grooved to receive a collar 132, which is not rotary, but which has opposite outstanding pins 133. To effect shifting there is provided a shipper member, one part of which is a yoke 134 straddling the collar 132, and each arm of the yoke being provided with a fork 135 which straddles one of the opposite pins 133. These elements 134 and 135 are the upper portions of a shipper or lever 136 arranged below the drive shaft and fulcrumed at 137 upon a drop bracket 138 mounted at the underside of the shaft bearing 71.

The clutch shipper 134—136 is a rocking member, and its upper end or yoke has swung rearward in Fig. 16 while its lower end or arm has swung frontward under the pull of a long link 140, seen also in Fig. 9, extending between the lower extremity of the shipper arm and an upstanding arm 141 fixed to and swinging with the pedal 54. The main pedal has been depressed to shift the described parts to driving position, where they remain until power is thrown off by the opening of the clutch; and the pedal is provided with a rear extension 142 which can be reached by the operator's foot for an emergency throw-off of drive.

Preferably the swinging or rocking of the shipper not merely closes and opens the clutch but at the same time releases and applies a brake. For this purpose the shipper lever is shown as provided with an extension or toe 144, extending frontwardly from the shipper fulcrum, and therefore thrown downwardly when the shipper rocks to position to open the clutch. The toe 144 co-operates with a brake lever 145, having an adjustable contact 146 adapted to be thrust downwardly by the swinging of the shipper toe. The brake lever is fulcrumed at 147 on a drop bracket 148 beneath the shaft bearing 71. The front end of the brake lever carries a brake shoe 149 adapted to be pressed upwardly against the brake collar 127 of the drive shaft, to effect quick retarding and stopping thereof whenever the drive clutch is opened. This gives an instantaneous stoppage of the main shaft, especially since the momentum of the machine parts is unable to act through the gear 124 to the worm 123 on the drive shaft.

The throw off of power and application of brake by the rocking of the shipper 136 may be either manual through the pedal extension 142 or automatic at certain points in the cycle of the machine. For automatic throw-off a resilient pullrod or bent link 151 is arranged with its rear end connected to the top end of the shipper and with its front end connected to a rockarm 152 upstanding from a fulcrum 153 on the drive shaft bearing 70. In order to pull frontwardly on the throw-off link or connector rod 151 the upstanding rockarm 152 is provided at its top end with a follower or roll 154 which cooperates with certain throw-off members 156 and 157, operated from the main shaft disk 125. These actuating members are shown as lugs, buttons, studs or cams projecting leftwardly from the gear disk 125 and partaking of the clockwise rotation thereof as seen in Fig. 16. The rockarm follower 154 stands partly in the path of the lugs 156 and 157, so that the lugs are able to thrust or cam the follower and arm frontwardly at predetermined points in the cycle, determined by the adjustable positions of the lugs on the cam disk. Thus the lug 156 is positioned to throw off the drive during the squeezing action upon each blank, enabling the blank squeezing period to be prolonged. In Fig. 16 the lug 156 in its rotation has contacted the follower 154 and is about to thrust the follower frontwardly with a short further rotation of the disk. The frontward throw of the follower pulls frontwardly the connector rod 151 which in turn rocks the shipper 136 and retracts the sliding hub 129 of the clutch to uncouple the shaft 119, at the same time applying the brake 149 to bring the released drive shaft to a stop, approximately at the time the cam lug 156 arrives at a point radially inward of the follower 154. At a later point, namely at the final end of each cycle, the second cam lug 157 similarly thrusts upon the follower 154 to cause again a stoppage of the machine, with the parts in position for the ready removal and replacement of each blank.

In order to permit the restarting of the rotation of the drive and main shafts after each described stoppage, a yielding means is necessary to permit the reverse throw of the lever, since the follower 154 and rockarm 152 are held locked frontward by one or the other of the cam lugs. This feature is provided by the form or character of the connecting rod or link 151. Instead of being a straight and rigid connection this link is shown as extensively bent, a simple arrangement being the right angle bend shown, with a short leg extending from one end of the link to an offset position from which the main length of the link extends to the other end. Obviously other forms of bending would afford resilience in this connection, or the link might be a telescoping connecting rod, with a strong additional spring tending to hold it in normal position. By any such arrangement, when the shafts have been stopped, and the follower is blocked as described, the pedal 54 can still be depressed, thereby to swing the shipper into clutching and unbraking position, by reason of the yield of the connector 151, upon which rotation is resumed, the cam lug quickly passing by the follower and relieving the operator of the need of holding depressed the pedal.

The die, templet or blank defining member 160 will be next described, in advance of the infolder system and the pressing means. It is best shown in Figs. 1, 9, 11, 14, 17, 18, 19, 30 and 31. It comprises in general the defining blades 161 which are interchangeable for various shapes of blank and which are the parts that come down directly upon the blank resting upon the supporting pad 88; also thereabove a system of movable blade carriers or slides 162 at the corners of the die and 163 at the middle of the long sides, having to do with the contraction and expansion of the die; all of these parts being mounted beneath or depending from the underside of a die body 164 in the form of a heavy oblong plate, which is supplemented by an overlying top plate 165, constituting the screw-attached cover or upper part of the body, these two parts being relatively fixed and rigid parts not movable except bodily toward and from the machine bed or pad and carrying the defining blades downwardly and upwardly therewith. The group of elements 164 and 165, and rigidly associated parts, may be designated a cross-head or diehead on account of the rising and lowering movements which it bodily undergoes.

With this invention the diehead 164—165 not merely partakes of the down and upswinging motions afforded by the swingarms 178 but undergoes an additional vertical descending and ascending movement, while close to the supporting pad, relative to what will be termed a swinghead provided at the front ends of the swingarms; so that when the die rises, its motion commences with a straight vertical lift as the diehead moves on the swinghead, followed by an upward swinging movement with the swingarms, and vice versa. The relation of the diehead and swinghead is best shown on Figs. 30 and 31, the diehead comprising the body or plate 164 and the overlying cover plate 165, while the swinghead comprises the front ends 166 of the swingarms 178 and, carried by the same, two or more slide bearings 167 in the form of upright bosses, at the ends of the respective swingarms, bored to receive and permit relative vertical play of a pair of sliding rods 168 upstanding from the cover plate of the diehead. By this mechanism, when the die is in its defining position, it is fitted for a short, straight vertical sliding movement relatvely to the swnghead 166—167, as well as the extensive upward and downward swinging movements provided by the swingarms which carry the swinghead.

Describing further the short vertical slide movement of the diehead, its relative descent may be brought about by gravity, its slide rods 168 sliding freely through the upright bearings 167. To limit the relative descending movement of the diehead a stop means is provided, shown in the form of a pair of stop fingers 169 upstanding from the cover plate and overlying a pair of stop members or abutments 170. These abutments function not merely to prevent undue descent of the diehead relative to the swinghead but also as a means of effecting the relative ascending movements of the diehead and the gravity-lowering movements thereof. For this purpose the two abutments 170 are shown in the form of swinging members or arms, adapted to contact the undersides of the stop fingers 169 or rather the adjusting stop screws 171 thereof. For a stable movement of these parts, the left and righthand abutment arms 170 are shown as swinging about a rear axis whereat is a pivot axle 173 on which the two abutments or lifting arms 170 are mounted, the axle being mounted upon left and righthand ears 174 upstanding from the front portions 166 of the respective swingarms 178. For actuating purposes the two rocking or lifting arms 170 are shown as rigidly interconnected by a longitudinal bar 175, from a convenient portion of which extends rearwardly an actuating rockarm 176, extending along the contour of the swingarms 178 or the crossweb 179 connecting such arms and at its rear end carrying a follower or roll 177 by which the rockarm can be swung downwardly at certain times to lift the swinging abutments 170 and thereby cause a short degree of vertical ascent of the diehead and the carriers and defining blades carried thereby.

The die carrying swingarms 178 may be separate, or may be interconnected by the cross web 179 at the middle portions thereof, the rear ends of the two swingarms being provided with hubs 180 turning upon or with the upper rear axle 121 extending between the upper rear bearings 79 and 80. For swinging this described system suitable power connections may be used and these may operate by thrusting frontwardly upon an extension arm or toe 181 provided on the left hub 180. The die and carrying arms being upswung by a thrust, as upon the hub toe 181, their downswing may be by the force of gravity, under control of the actuating means; and by this arrangement the die and arms are at all times freely swingable by hand at will up, over and back to an idle position, seen in the top view, Fig. 11, whereat a fixed abutment stop 182 receives through a second toe 183 the gravity weight of the parts, as is conventional in such machines.

The swinging connections from the main shaft 120 may be as follows. The frontward thrusting of the depending toe 181 may be effected by a thrust pin 184 guided by a radius arm 185 which keeps the pin in thrusting relation to the toe to effect upswing of the die, see Fig. 30. The frontward pull or thrust may be brought about by a drawbar or link 186 extending from the thrust pin 184 to a double or two-sided yoke 187, seen also in Fig. 9, the drawbar being pivoted at 188 to the yoke between the cheeks of the latter. Each yoke cheek is shown with a substantial slot 189, straddling and giving guidance upon the hubs of the cam 192 on the main shaft 120. The frontward actuation of the yoke and drawbar is effected through a follower or roll 190 near the front extremity of the yoke, this roll bearing upon the periphery of the cam 192 fast upon the main shaft. The cam is shown as having a slant 192$^a$ by which the follower moves rearwardly to allow the die to descend, followed by a dwell 192$^b$ during which the die has no swinging movement but may descend or ascend vertically, succeeded by a slant 192$^c$ which thrusts frontwardly on the follower and causes the swingarms and the die to lift to the position shown in Figs. 1 and 9, and a second dwell 192$^d$, occupying the greater part of the cycle, during which the die remains in its upswung position, which position is indicated also in Fig. 30 by dotted lines.

The contour and timing of the die-swinging cam 192 and its rotary position on the main shaft are such as cause die swing movements coordinated with the other actions of the machine in each cycle; and the various other actions are similarly coordinated, thus to afford a complete cycle suitable for performing the defining, folding and squeezing of whatever kind and form of blank is to be handled; an example of such cycle to be described in connection with the diagrams of Figs. 40 to 49. Accurate setting of the lowered die to the blank and pad is by screws 191 for adjusting the cam follower 190.

The timed actuation of the rocking abutments 170 to lift slightly the die vertically before its collapse in each cycle is shown as cam-effected from the main shaft as follows. A shiftable bar cam 194, Fig. 30, in the form of a bar carrying a wedge, with a thin tapered front extremity 195, is adapted to be pushed frontward above the rockarm 176, preferably between the rear end of the arm and an adjusting set screw 196 projecting below the swing-arm web 179 by which the initial position of the diehead may be correctly predetermined; thus depressing the arm and bodily lifting the abutments 170 and die relatively to the swinghead, to be later restored by reverse motions. For such operation the rear end 197 of the wedge bar 194 is forked to straddle the rear axle 121 for guidance, and carries a follower 198 entered in the cam or groove 199 of a cam disk 200 whose hub 201 is loose upon the rear axle 121, and which serves also as the cam for the die contracting connections to be described. The follower, by a set screw 202, is adjustable upon the wedge bar 194 toward and from the cam axis, thus to permit an initial adjustment of the bar relatively to the cam, determining the relation of the tapered end 195 of the bar to the follower 177 and set screw 196 between which it floats, and to predetermine with fine adjustment the extent to which the wedge end will enter between said element, and thereby the extent or distance through which the rocking abutments 170 will lift the diehead relatively to the swinghead in each cycle.

The cam groove 199 in the disk 200, for effecting the controlled short vertical lift of the diehead, is shown as mainly composed of a dwell 199$^a$, followed by a first slant 199$^b$, effective to throw frontwardly the follower 198 and the wedge bar 194 to lift the diehead, followed in turn by a short duration of dwell 199$^{a'}$ during which other motions of the cycle take place, and followed in turn by a return slant 199$^c$ retracting the wedge bar and allowing the rocking abutments to lower again the die head to normal position. The cam disk 200 is rotated counterclockwise as seen in the righthand elevation of Fig. 30, turning loosely upon the rear axle 121. For the continuous drive of the cam, when the power is on, suitable connections from the main shaft 120 may be provided, of which the following is an example. Attached to the hub 201 of the cam disk 200 is a sprocket wheel or gear 203 engaged by a continuous sprocket chain 204 which also engages with one-to-one ratio a sprocket wheel 205 on the main shaft 120, as seen in Fig. 32. In order that the sprocket chain may travel in a path free of interference with other parts, the chain is passed around a pair of idlers 206, carried on a bent lever 207 whose hub is loose on the upper rear axle 121, and with an adjusting contact screw 208 provided near the end of the lever and bearing against a bracket 209 attached to the frame top wall 66 and forming a fixed contact, the screw 208 also being available for taking up slack in the chain.

In Figs. 30 and 31, as in Fig. 45, the die has just descended upon the blank on the pad or support 88, prior to the infolders moving inward over the edges of the die blades; and shortly the die, suspended from the swinghead, is to receive a normal or vertical lift in a short amount preparatory to the contraction of the die out of the folds, following which contraction the die is swung up to its elevated position indicated by comparison of the full lines and dotted lines in Fig. 30. The value of this parallel lift of the diehead, hung from above for that purpose, is that it insures an equal degree of lift, for contraction purposes, around the entire periphery of the die, which it is found can not be satisfactorily done by employing only a swinging rise of the die, the latter motion introducing a decided tilt of the undersurface of the die, precluding accurate operations especially in handling blank shapes having a large fore-and-aft dimension. On the other hand the attempt to contract a die without the slight lifting motion to relax its pressure on the blank is known frequently to cause difficulties by the dragging of the material of the blank out of place and causing a substantial amount of defective operation and product. These difficulties are eliminated by the disclosed plan of a slight relaxing vertical lift of the entire die, in cooperation with a similar lift of the folders, followed by die contraction and upswing, while the folders are caused to lower again for the squeezing and fixing of the folds.

Next will be described the construction of the die as regards its contracting and expanding movements, best explainable on Figs. 17, 18 and 19 taken with Figs. 1, 9, 11 and 30. Underneath the die body plate 164 are the corner carriers 162 and the side carriers 163, which carriers have guide shoes 212 and 213 respectively, the shoes 212 running in diagonal ways 214 in the body plate, the shoes 213 running in fore-and-aft ways 215. The arrangement constitutes an illustrative example, subject to many changes, by adjusting or interchange of carriers, for different shapes of blank. In the illustrated die the four corner carriers are contracted by a diagonal inward movement, the side carriers by a right angle inward movement, the blank defining plates being carried therebelow and partaking of the same contracting movements. Proper alinement of corner and side carriers and plates is secured by means of longitudinal alining bars 217 running in undercut ways 218 at the top side of the carriers, and centrally attached to the side carriers 163.

The die blade mountings beneath the carriers are best shown in Figs. 11 and 14. Each blade is screw attached beneath a holder 220, which has an upstanding shank 221 which is longitudinally elongated and has a top flange. Each carrier 162 or 163 is formed with underneath grooves 222 to receive the top flanges of the die blade shanks. This permits longitudinal adjustment of the die blades, the adjustment being secured by a clamping bar 223 which itself is doubly flanged, one flange bearing on the flange of the blade shank and the other upon the underside of the carrier, with a screw 224 passing through the clamp bar and into the carrier.

Coming next to the connections for contracting and expanding the die, the guide shoe 212 for each rear corner carrier has pivoted to it a link 226, while each front shoe has pivoted to it a link 227, these two links, at each end of the die, extending to the outer and inner corners respectively of a rocking plate 228 pivoted at 229 at the top side of the die body plate 164, the oscillating plate 228 being in effect a three-armed lever, with two arms for the guide shoes and a third arm for actuation through a link 232. These and associated parts, mounted atop the body plate are enclosed by cover plate 165, seen in Fig. 30 and indicated in dotted lines in Fig. 17; and inside of the same interior space is provided also a laterally slidable bar 231, the rear end of which projects beyond the rear edge of the body plate, where it carries a head 233, seen also in Fig. 30. From the left and right sides of the sliding head 233 extend the links 232 to the rocking plates 228, so that the reverse sliding movements of the bar cause the rocking of the two plates and thereby the simultaneous inward and outward movements of the several guide shoes and the die blade carriers therebelow.

For actuating the slidebar 231 in its rearward or contracting motion and its return or expanding motion, are shown the following connections. From the barhead 233 extends a link 235, seen also in Figs. 1, 9 and 11, this link extending to a device 236 comprising a slotted swingable member through which is effected a connection between the link 235 and a yoke member 237 which for its guidance straddles the hub 201 of the cam disk 200. The member 236 is pivoted to the swinging web 179 of the die carrying arms and is slotted in order to provide an adjustment of the pivot between the member and the link 235; by which arrangement a given cam motion of the yoke 237 can give a variable throw to the link 235, the slidebar 231 and the parts beyond. As best seen in Figs. 9 and 11 the yoke 237 carries a stud 239 which projects leftwardly from the yoke into a cam groove 240 formed at the righthand face of the disk 200, while for initial adjustment the stud 239 can be shifted on the yoke by means of an adjusting screw 241.

By these means the cam groove 240 at the righthand side of the disk 200 constitutes the timing cam for the contracting and expanding movements of the die. The exact contour of the cam or groove 240 is not necessary to show, being on known principles, the die descending upon the blank in its expanded condition, as in Figs. 44 and 45, where it remains during the infolding operation as in Fig. 46, following which and following the slight vertical rise of the die, the die is contracted by the cam 240 out of the blank folds as in Fig. 48, being at any time thereafter restored to expanded condition in preparation for the descent of the die in the next cycle.

The die mechanism thus described affords a great variety of ways to arrange and mount and operate the die holders 220 beneath the set of carriers 162, 163. Figs. 11, 14 etc. show two longitudinal mounting grooves 222 to each of the six carriers, a total of twelve grooves, for that many die blade locations, and with longitudinal adjustment as required for various shapes to be folded. The arrows in Fig. 11 and Fig. 18 show the directions in which the carriers and blades may be contracted. The fore-and-aft adjustment of the position of the transmitting bar 231 is by the follower-adjusting screw 241. The extent of throw in the contracting and expanding motions is adjustable by the lever member 236. Such die mechanism is practically universal in its usefulness. When a blank is to be folded such that contraction of die is not essential for effective squeezing of the folds, as occasionally is the case, various described parts can be omitted, while other parts may function as described in this specification.

Coming next to the system of infolding means it comprises usually a plurality of infolder plates, referred to as folders, having at their inner or folding edges contours corresponding substantially with the die, and both the blades of the die and the folders are readily and quickly adjustable or interchangeable in accordance with the shape or character of the blank to be folded. In the illustrated example a system of two folders is shown, one folder 245 for the righthand end and part of the rear of the contour and another folder 246 for the lefthand end and the remainder of the rear contour, this shape, being a jumper pocket as in Figs 2 and 3, requiring no folding along the front side. On top of each folder near its folding edge are removably attached the conventional gage members 247, so set as to accommodate between them the raw or unfolded blank. There may be one, two or more folders.

While the folder motions may be straight or diagonal, and the mounting and adjusting means so provides, in the example shown the two folders are caused to move inwardly along approaching diagonal directions, so as to turn the fabric over inwardly and down upon the left and righthand and rear edges of the die. This inward infolder movement, and the subsequent outward movement may be considered as the advancing and retracting motions of the infolder set or system. Additionally, as will be described the system of infolders is fitted to rise bodily, or be lifted, to a small extent, to clear the thickness of the die for the advancing inward or folding movement, with subsequently a further slight lifting movement, at the time that the die lifts vertically to a slight extent to relax its bearing upon the blank for contraction purposes; the infolder after the die contraction being promptly lowered in order to hold and press the folds of the blank by the weight of the parts, to be followed by the powerful depression of the folders to squeeze and crease the folds between the folders and the underneath support. The mountings permitting these various folder movements will next be described.

The infolders are shown as mounted indirectly but rigidly upon carriers or folder blocks 249 which in turn are all mounted upon one or the other of two long and heavy longitudinal folder bars or carriages 250, which are hollow to accommodate certain working parts. The carriers or blocks 249 are arranged to slide longitudinally on the carriages 250, at the front and back of the machine, this affording the longitudinal in and out movements of the folders, while the carriages 250 each have a transverse or fore-and-aft inward and outward movement and as well up-and-down movements for the lifting and lowering of the folders; the mountings and actuation of these important elements to be described.

The mounting of each infolder plate, as 245, upon one or more carrier blocks 249 is preferably as follows. Upstanding from each block is a stud 252, with its threaded shank entering a tapped bore 253 produced at a desired position on the block. Each stud has a groove 254 near its top end, above the folder, and below the folder a spacing means, as a washer or sleeve 255, holding the folder elevated above the block. These parts are shown in various figures on Sheets 1, 3, 5, 6 and elsewhere, which show also the means of locking the folder in position. The folder is either apertured or bored to receive the stud, as seen in Fig. 13, and it is locked by means of a clip piece 257 shown separately in Fig. 12, this being recessed at 258 to engage within the stud groove and having an upstanding ear 259 for applying and removing the clip when a folder is to be readjusted or interchanged. For convenience each clip may be attached upon its folder by a pivot pin and hole 260 so that it may be swung aside for detachment and replaced at will, without loss of clip.

The mounting of the folder block 249 upon the carriage 250 is by means of a dovetail groove 261 in the block engaging a dovetail rib or way 262 on the carriage, permitting longitudinal relative movements of the blocks upon the carriages. For effecting such block movements the following means are shown. At its upper side the carriage is formed with an alining groove 264, while the block has a complementary groove 265. These grooves have a portion of their longitudinal length occupied by one or more alining bars or sliders 266 which can slide freely on the carriages but are adjustably locked to the blocks for any required adjustment. Such locking means may be in the form of a gib 267 within the groove 265, and an exteriorly accessible bolt or screw 268 which is tightened to compel the block to move longitudinally with the movements of the alining bar 266, in a manner to be described. When the set screw 268 is relaxed the block and carried folder may be longitudinally adjusted to suit the work in hand and the block again clamped to the slider or alining bar. Through the carriage groove 264 the two folders at the front or rear side are maintained in proper alinement throughout their operative actions. The carriage is hollow by a groove 251 open below.

Each carriage 250 may be considered as floating on its actuating mechanisms, needing no other support; but its endwise positioning is provided by a depending lug 270 near each end of the carriage, see Fig. 9, these lugs cooperating with stop screws 271 projecting inwardly from the frame end walls 51 and 52. The lugs are also utilized for the carriage lifting and lowering movements, as will be described, and the lifting connections might be employed to give normal support to the carriages and folder system when lowered; but for such initial support each carriage at each end is shown as resting down upon a shoulder 328 which is formed on a part of the mechanism to be described which effects the transverse in-and-out movements of the infolders. Eventually the support of the carriages, carriers and folders is upon the frame top plate 66.

The movements of the infolder system comprise bodily lifting and lowering movements as already described, effected by the simultaneous lifting and lowering of the front and back longitudinal carriages or folder bars 250, and inward and outward or advancing and contracting movements, which may be considered as divided into two components, namely longitudinal or rightward and leftward and transverse or frontward and backward. It is convenient first to describe the connections for effecting the lifting and lowering movements of the entire infolder system, with reference particularly to Figs. 9, 33, 34 and 35. There are shown lifting members or toes 274, at the front, adapted to bear upwardly upon the lower ends of the depending lugs 270 of the front carriage or lifting bar 250 and generally similar lifting toes 275 at each end of the back carriage; the front and back toes at each end being arranged to swing upwardly for lifting purposes and being interconnected by a rockshaft 276, extending fore-and-aft through bores formed in the frame top wall 66 as bearings. At the front the lifting toe 274 is mounted indirectly on the fore-and-aft shaft, being secured adjustably upon a depending arm 277 through which actuation is transmitted. The front toe is adjustable on said arm so as to bring it into exact timing with the rear toe, so that both ends of the two carriages will be lifted simultaneously to maintain the infolder system horizontal throughout lifting and lowering movements. Such a coordinating adjustment of the front lifting toe 274 is shown as provided by means of an adjusting eccentric 278 cooperating with a pin-and-slot mounting 279 of the end of the toe upon the depending lever.

By these arrangements the infolder system may be bodily lifted by swinging outwardly, from each other, the two depending front arms 277 near the left and right ends of the machine, with return by gravity. At the lower end of each arm 277 is provided a cam follower or stud and roller 280, mounted on the arm by an adjusting device comprising a concentric slot in the arm, with right and left adjusting screws 281 to shift the stud relatively on the arm and a lock nut 282 on the stud to secure the adjustment. Thus exact coordination at the two ends may be attained. The stud roller at the left runs upon the open face of a cam 284 while at the right the roller runs on a cam 285. These cams are formed on cam disks 286 and 287 respectively, the hubs of which are secured on the main shaft 120, and the left disk 286 carrying also a second cam, to be described, taking part in the blank pressing operations. The two cams are symmetrically alike and their contour is partially indicated in Figs. 9 and 34 and is shown in greater detail in Fig. 43, the cams having a succession of slants and dwells to carry out the general cycle of operation in coordination with the other movements of the folders, the movements of the die and the pressing action. The successive diagrams of Figs. 44 to 49 indicate also these relative inward, outward, upward and downward movements, as does the motion diagram of Fig. 40.

The extent of folder lift is determined by the symmetrically opposite contours of cams 284 and 285, with further adjustment possible by varying the clearance or gap between lugs 270 and toes 274 and 275, namely, by means of the adjusting devices 281, 282 at the foot of the drop arms 277. In assembling, the front and back carriages are first brought to the same level at each end by the first adjuster device 278, 279. Then the left and right ends are brought to a desired level by the second adjuster 280, 281. The lift cams then give true lifting movements to the system and allow gravity to lower the system according to the cycle. The retracted folders drop to rest on the pad; but with the use of a pad shaped to the outline to be folded the folders could finally retract far enough to be lowered into a position with their upper surfaces substantially flush with the pad, in accordance with a well-known plan of operation.

Coming next to the inward and outward movements of the infolders, whether one, two or more in number, these include separately determinable longitudinal and transverse components, simultaneous or in succession. The general purposes of the disclosed constructions, shown principally on sheets 2, 3 and 5, are easy adaptability to various blank shapes and kinds and affording, first, optional setting or selecting of the direction or angle of movement of each folder in relation to the blank and die, second, optional timing combinations of the folder movements in relation to each other, and third, special ability to select infolder locations around the center of the pad or support with respect to the middle portion of the blank. With these purposes met, the basic machine can perform folding of substantially all blank forms and kinds heretofore done in the many known constructions of folding machines, and indeed additional forms of blanks. As herein described the machine of this invention contains built-in adaptability of structure, combination and operation for a vast variety of practical uses. Further, auxiliary devices may be readily applied in order to extend the utility without altering the basic machine.

The herein described machine further has the following advantages. The set of folders is always in a single plane, shiftable upwardly and downwardly, but always parallel with the bed throughout the cycle. The motions of the respective infolders may be determined and effected independently of the others, and so may the timing thereof, with no need of overlapping motions. There is also independence of adjustments of the respective folders, so that no adjustment requires compensating adjustments elsewhere in the machine. The described infolder system is self-supporting, provides easy access for interchange or adjustment and is capable of long wear. Leaving for a later period a specific description of the variety of motion combinations of the infolders, the illustrated structure will first be described.

Taking first the longitudinal in and out folder movements, these are effected by the sliding of the carriers or slide blocks 249 along the longitudinal carriages to which the carriers are slidingly dovetailed. The movements are effected by the alining bars 266, of which there are four shown, one at each end of each carriage, these alining bars sliding in the alining grooves or slots 264 of the carriages, and the carriers being adjustably clamped to the alining bars by the gib devices 267, 268. The sliding of the alining bars is preferably effected from the longitudinal center of the machine, front and back, and for this purpose, at the inner end of each alining bar it is shown as carrying a depending arm 290. Thus at the front, seen in Fig. 9, the two depending arms 290 pivotally hung from the alining bars have only to be thrust apart and together to cause outward and inward longitudinal folder movements. Each arm 290 may be considered as constituting a telescopic extension of a lever arm 291 upstanding from a rockshaft 292, the two rockshafts extending transversely to the back, through bearing holes in the frame top plate 66. This permits a similar structure at the back side for the corresponding simultaneous actuation of the alining bars 266 at the back. The longitudinally operating mechanism is best seen in Figs. 9, 11, 23, 24, 25 and 27.

Continuing the description of the longitudinally operating means, the lefthand upstanding lever arm or fork 291 has its hub 293 at the front end of the left rockshaft 292, and this hub carries also a depending arm or cam lever 294, the low extremity of which is provided with a follower, as a stud and roller 295, to engage a cam 300 therebelow. This cam therefore rocks the lefthand lever and shaft 292, and to communicate this motion to the righthand shaft and parts beyond the following interconnections may be used. Each of the telescoping arms or forks 291, at its hub on the shafts 292, is provided with an outwardly extending short arm 296, and these two arms at their distal extremities are pivoted to drop links 297, these links connecting respectively with a pair of levers 298 fulcrumed at their distal ends by studs 299 outstanding from the frame wall 66, the overlapping central ends of said levers being interconnected with a sliding engagement, thereby transmitting symmetrically the rocking movements from one to the other of the shafts 292, and causing the alining bars 266 and folder carriers 249 to move endwise outwardly and inwardly in unison.

The cam 300 is the middle one of a cluster of three cams, and its cam groove 303 has slanting parts and dwells acting upon the follower 295 to produce the desired longitudinal components of folder movement. The righthand cam 301 of the cluster operates through transmitting connections to give transverse inward and outward movements to the front carriage 250, carrying with it the folder plates upon the carriers. The left cam 302 of the cluster has analogous connections for similarly actuating the rear carriage 250 to move transversely in and out. The timing of the cams giving the transverse movements may be quite independent, wherefore wholly different movements or transverse components of movement may be produced in the folders which are carried respectively by the front and rear carriages.

The middle cam 300 of the cluster has its cam groove 303 at its periphery for engagement by the follower 295, and the cam has its hub 304 keyed to the main shaft 120. The other two cams of the cluster are loose upon the hub 304 or upon the shaft 120 but are secured or clamped to the middle cam in an adjustable manner, to change the order of transverse and longitudinal movements or components as required. An effective clamping means consists of the provision of a pair of bolt holes 306 formed in the web of the middle cam, while correspondingly in each of the side cams there is a central bolt hole 307, forming part of a series, with other holes 308 for relatively advancing each cam and other holes 309 for retarding it. When circularly adjusted to their proper relative positions the mutual securing or clamping together of the three cams, to form a cooperative unit, is effected by a pair of through bolts 310 passed through the center cam bolt holes 306 and the selected holes of the side cams. When the side cams are adjusted to have their central bolt holes 307 in line with holes 306, then the longitudinal and transverse movements produced in the infolders are diagonal, each infolder moving inwardly with simultaneous endwise and sidewise components. Other adjustments may change the order of the components at will.

As already stated, the actuation of the front carriage and supported parts is independent of that of the rear carriage and supported parts. The front carriage, with its carriers and folders is moved inwardly and outwardly transversely by the cam 301, for example by the following transmitting mechanism. Supported upon a pair of fixed brackets 312 depending from the wall 66 is a fulcrum rod 313 upon which swings a special form of lever having a depending arm 314, the extremity of which carries a follower 315 entered in the cam groove 316 at the righthand face of the cam 301. This groove is shown in Fig. 26 and is formed with two slanting portions separated by dwells. The cam lever has an upper arm 318 in the form of a plate, longitudinally elongated and straddling certain other mechanism to be described. This upper arm at its left and right upper corners has vertical extensions 319 reaching up into a transmitting element, which will be termed a shoe member 325, seen in Fig. 20, wherein the extension is continued in a flattened form 320, see Figs. 21 and 22, where it is provided with a pivot pin 321 connecting it to a pair of small flat slides 322 together constituting a square block which is part of a universal joint between the cam lever 314, 318 and the shoe member.

The shoe member 325 is a motion transmitting member having several functions as will be described, and the described connections from the cam 301 serve to shift the shoe member transversely inwardly, that is, rearwardly, to put the front carriage 250 and supported parts through the same motions. The groove 316 of the cam 301 has a first slant 316$^a$ which throws frontwardly the lever arm 314 and thereby shifts rearwardly or inwardly the shoe member and the carriage and holders thereabove, this being timed to take place after the die has been positioned upon the blank and after the infolder system has been slightly lifted for the folders to clear the die. The return cam groove slant 316$^b$ is considerably later in the cycle, retracting outwardly or frontwardly the supported folders near the end of the cycle following the forcible squeezing of the blanks beneath the folders.

The description of the front shoe member 325 applies likewise to the rear shoe member 345 producing the in and out transverse movements of the rear carriage 250. The shoe member 325 is shown as a hollow structure, its body being substantially cubical and containing a space within which extends the cam-actuated extension 320 and the block 322 pivoted atop the lever arm extension. At its outer or front side the shoe member is provided with a cover plate 326 which is removable for access and assembly purposes, being screw-attached to the front face of the shoe member. Upstanding from the top side of the shoe member body is a shoe 327 which is accommodated snugly within the underneath recess or groove 251 at the underside of the carriage 250. By its transverse movements the shoe causes similar movements of the carriage, while at the same time the carriage is free to be lifted relatively to the shoe member, with sliding motion between carriage and shoe. Near the foot of the shoe extension 327 the shoe member is formed with a shoulder or ledge 328 which constitutes the means of support of the carriage when lowered to normal position.

The shoe member 325 is provided also with the transverse inward extension or stem 330, which may be in the form of a cylindrical rod passing through a bore 331 formed in the fixed frame wall 66. This allows for the transverse in and out movements of the shoe member, carriage and parts thereabove, as best seen in Fig. 20. Completing the description of the shoe member, its recess contains a flanged box or short slideway 333 confined between the left and right walls of the recess, but which is adjustably slidable rearwardly and frontwardly, while the block 322 atop the cam lever is slidable vertically in the box. This allows for the necessary vertical movements of the block as the cam lever upper arm 318 swings. In order to provide a means of initial adjustment to predetermine the relation of the shoe member and parts above to the cam and cam lever below there is provided an adjusting screw 334 extending through a tapped hole in the box and having its ends reduced for rotation in apertures formed in the front cover 326 of the shoe member and the opposite or rear interior wall. This screw may be turned in order to move the shoe member and carried parts relatively frontwardly or rearwardly, and when adjusted the parts are so held by means of a lock nut 335.

It will be understood that for the front carriage 250 there are two complete shoe members 325 and shoes 327 as described, operating at spaced apart points on the carriage and both simultaneously shifted transversely by the same cam lever 314, 318, thus to insure smooth inward and outward movements of the carriage with strict parallelism. For the similar movements of the rear carriage there will similarly be two spaced apart shoe members, of which one is illustrated in Fig. 20, the structures and operations of these rear shoe members corresponding, except in timing, with the two shoe members at the front. In regard to the front pair of shoe members 325, and the rear pair 345, to be further referred to, the following considerations are recited. The shoe members of each pair convert the arcuate swinging movement of the cam lever to a straight horizontal transverse motion, by reason of the sliding of the stem within the bore in the frame. The shoe member by its upstanding shoe provides a sliding engagement or coupling between the shoe member and the carriage or folder bar above, so that the latter may be lifted and lowered vertically quite independently of the horizontal motion produced by the movements of the shoe. The shoe member embodies means of adjustment of position of each carriage, and this adjustment is such as not to interfere with the amount or direction of inward and outward movement produced by the cam lever, due to the fact that the axis of the adjustment by the screw within the hollow shoe member substantially coincides and is parallel with the sliding stem of the shoe member. The two shoe members for each carriage functoin to line up truly the carriage lengthwise of the machine, keeping the carriage motion parallel and at the same time squaring up the carriage in its vertical position. The shoe members upon which each carriage are mounted provide a support for the carriage, bracing it against any tilting forces that may occur during the folding of the blank due to the fact that the pressure of the folding motion is applied above the carriage and even above the folder carrier slidable thereon; and when the parts return to normal position, with folders retracted, the shoe member provides the seat 328 upon which the carriage rests, needing no further support, the wall 66 taking the weight.

The means for effecting the frontward and rearward movements of the rear carriage 259 and parts supported thereon are analogous to those described for the front carriage and may be briefly identified as follows, especially in reference to the righthand side of Fig. 20. By a pair of depending brackets 338, analogous to the brackets 312, and a fulcrum rod 339 thereon, a cam lever is supported comprising a first or cam arm 340 at the extremity of which is a follower or stud 341 running in the cam groove 342 in the face of the lefthand cam 302 of the cam cluster. The cam groove, as seen in Fig. 28, has a first slant 342$^a$ which causes the inward motion of the carriage and later a return slant 342$^b$. The second arm 343 of the cam lever extends upwardly to a rear shoe member 345 from which stands up a shoe 346 accommodated in the underneath recess or groove of the rear carriage, the shoe member having a frontwardly extending stem 347 slidable in a bore or way in the frame top plate; it being understood that there is a spaced pair of the shoe members 345 for insuring parallel fore-and-aft motions of the rear carriage, the same as with the front carriage.

The pressure applying means for squeezing the folds between the folders and underlying pad will be described before explaining the diagrams of Fig. 15 and Figs. 40 to 49. The mode of depressing the infolders will be described primarily upon the diagram Fig. 39 in connection with Figs. 36—38 and to some extent Figs. 1, 9 and 11. The plan of the invention, to provide simple pressure means which at the same time is rapidly shiftable for changes in infolder form or adjustment, is to employ what may be described as portable presser devices 370 which may be placed upon the machine bed cover plate 86 in various locations at will by making use of the undercut grooves 87 in the bed cover top as already described. Each presser device is mounted upon the cover plate either by such groove or by a drilled and tapped hole at any desired point, so that when the infolder system is set up any requisite number of presser devices may be arranged surrounding the infolders, but reaching in over them to make pressing contact upon the folding edges of the folders, for example as seen at the righthand side of Fig. 11. This invention permits the pressure to be applied quite near to the folder edges, thereby increasing the effectiveness of the blank squeezing action. Fig. 11 also shows various other optional positions of the presser devices, any one of which may be swung about its mounting means so that it can reach in endwise or sidewise, or diagonally.

There is no need to expand on the possibilities of this system of portable pressers locatable substantially at will. One presser 370$^a$ is shown in Fig. 11 arranged longitudinally and directed inwardly, its mounting being at the inner end of one of the undercut cover plate grooves 87; and in connection therewith a dot-and-dash line 369 shows that this presser possesses a large range of adjustable influence, being swingable around in any direction and shiftable bodily toward and from an infolder which may overlie the pad 88 upon which rest the blanks to be folded. The quickness of readjustment of the machine, for example to alter the size or shape of an article, or both, is illustrated by the described arrangement, wherein for shape change the folder may be quickly detached by disengaging its clip 257, and its supporting carrier 249 then unclamped from the alining bar 266, and shifted to a desired new position, the carrier being again clamped to the bar, the different infolder attached on the carrier and the presser device reset according to the new position; while for size change the adjustment can be more easily made, without detaching the folder from its carrier.

The presser devices are actuated through a rotary cam 350 appearing in Fig. 9 at the righthand side of the cam disk 286 which also carries the lifting cam 284, near the left end of the main shaft, as seen also in Fig. 36, which is a rear view. Referring thereto and to the diagram Fig. 39, the cam 350 has a first slant 350ª causing the pressure to be applied, followed by a dwell 350ᵇ holding the pressure upon the goods and then a return slant 350ᶜ to a dwell 350ᵇ' releasing the pressure thereby to permit the retraction of the infolders, which thereafter remain idle until the next cycle. The cam 350 at its periphery acts upon a follower or roll 351 mounted at the end of an upstanding cam 352 of a cam lever, which includes a rockshaft 353 that carries also, further to the left, a second or forked upstanding arm 354, the formed end of this lever arm being coupled with the front end of a pitman or piston rod which plays rearwardly and forwardly within the hollow drop bracket 72 and extends to a pressure creating means or pump, in this embodiment to a pump piston 357 movable within a cylinder 358. The cam-produced thrust of the piston operates the pump, and there is provided at a convenient point, for example within the hydraulic cylinder, a resilient or spring means 359 opposing the action of the cam 350 by tending to return the piston to its retracted position. Within the cylinder is enclosed a body of hydraulic liquid 360, as a light oil, which serves as the transmission means communicating the active thrust produced by the cam and delivering it to the various presser devices to be described.

The use of hydraulic pumping means for transmitting operative motions generally is of course long well known, and there are various types and kinds of pumping means, wherefore the pump 357, 358 is herein disclosed in principle rather than in detail. When the cam rise a thrusts the piston inwardly in the cylinder the liquid is forced out from the cylinder through a suitable passage 361 leading to a manifold or distributing means 362 by which the various presser devices are supplied. A transparent oil supply reservoir 363 may be added connected by pipe 364 with the pump cylinder or manifold, to furnish needed liquid to the system in case of loss by leakage and affording also a visible indication of faulty operation.

The distribution of liquid to the various pressers preferably commences in a series of metal tubes 365 taking off from the manifold, and each of these having a coupling 366 at a suitable terminal point, from and beyond which terminals the pressure is communicated through local flexible or rubber tubing 367 of a kind well known for such purposes. These flexible tubings are seen on the drawings disposed in various ways according to the relative location of the respective terminal couplings and the mounting positions of the presser devices. Any and all mounted pressers may be quickly loosened and adjusted to inoperative positions, or may be detached from the machine bed and laid aside without detachment from the rubber tubes, for example, as in Fig. 1 where the pressers at the right end of the machine have been shown detached and removed to remote positions for better illustration purposes.

Coming next to the portable presser devices 370, these are well shown in elevation in Figs. 9 and 36, and in top view in Fig. 11, and diagrammatically in Fig. 39. Each presser in its preferred form comprises a base member 371 and a depressing, clamping or thrusting member 372, the base being affixable to the bed cover 86 while the clamping member is connected tiltably upon the base member. These two members are shown separately in Figs. 38 and 37 respectively, but when interconnected as in the other figures their operation is that the clamper or member 372, centrally pivoted upon the base member may be hydraulically operated by lifting its outer or heel end, thus causing its inner or toe end to lower and become forcibly thrust downwardly upon the folding edge of an infolder. The base member has a mounting portion 374 and an abutment portion 375 both of which rest upon the bed 86 when in use. The mounting portion is formed to receive a clamping bolt 376 extended down through the base member, its threaded lower end passing below the bed level 86 where it is secured either to a nut 377 slidably accommodated in an undercut bed groove 87, or threaded directly into a tapped hole drilled in the bed for the purpose, in a desired location. At the upper part of the upright mounting portion 374 is provided a pivoting means or pin hole 378 formed in an outstanding ear, this pivot hole cooperating with a corresponding hole in the clamp member, for the rocking of the latter upon the base, a pivot pin being inserted through the respective holes. The base member at its abutment portion is formed at the top side with a connecting means, which may be a mere contact as in the form of a sphere 379 serving as a connection between the base and the hydraulic devices on the heel end of the tilting clamp member. At its tail end the base member is provided with a projection 380 for the mounting of the lower end of a pull spring 381, the upper end of which is connected under tension with a similar pin 382 on the heel end of the clamp member. The spring therefore tends to elevate the toe or pressure end of the clamp member and restore the parts to normal position when pressing is completed.

The clamping or depressing member 372, tiltable like a walking beam upon the pivot 378 has an outer or heel portion 384 and a pressing portion 385 at its inner end, the extreme end of the latter constituting a pressing toe or horn 386 of the tilting member. At its heel end the tilting member carries a hydraulic piston 388, recessed underneath at 389 for a connection with the spherical contact piece 379 of the base, the piston playing up and down within a hydraulic cylinder 390, with its lower end open; the cylinder providing a substantial interior chamber 391 above the piston and having liquid communication with the distributing pipes of the system. For this latter purpose the heel portion is formed with a threaded entrance passage 393, shown occupied by a nipple 394 to which the end of one of the flexible tubes 367 is coupled, to communicate hydraulic pressure to the cylinder and piston. There is also indicated a threaded passage 395 for a special nipple 396 constituting part of an air bleeding valve 397. The illustrated piston and cylinder arrangement functions as a hydraulic motor whereby the hydraulic pressure created by the main shaft cam 350 is communicated to the portable presser device in a way to produce mechanical pressure downwardly upon the folder edges, but other forms of hydraulic motor may be employed to give the same operation and result, such as a motor of the diaphragm or of the bellows type. In the illustrated motor, the entrance of liquid under pressure tends to force relatively downward the piston 388, but since the piston bears firmly upon the connection or sphere 379 of the base, the piston is effectively immovable, so that the pressure reacts against the top wall of the chamber 391, forcibly lifting the heel end of the tilting member and thus thrusts downwardly the other end causing the toe 386 to act upon the folder. Every presser device which is in operative connection with the source of hydraulic pressure is thus operated, all of these operations being simultaneous, and by the inter-connection of all of the devices by a common piping system, leading from a single or master pump, an equalizing action is afforded, so that the squeezing pressure of the several infolders is uniform around all folded edges of the blank. When less than the full number of presser devices is in use for any given work the unused devices may be rendered inoperative by shutting off communication through valves or the like, or the idle presser devices may be left in idle positions on the bed.

The mechanical parts of the illustrative embodiment having been described the general method and principle of operation will be outlined with the aid of the diagrams Figs. 40 to 49. The machine having the basic instruments, the blank-supporting bed, the defining die extractible or contractible from the folds and liftable above the bed, the folders inwardly movable and liftable, and the pressing means for squeezing blanks between the bed and folders, the method is practiced consisting in lowering the die into position upon each blank, and advancing inwardly the folders over the die edges to form the folds, then slightly lifting parallelly or vertically the die just sufficiently to relieve it of frictional pressure upon the blank, accompanied by a slight lift of the folders, then extracting the die from the folds for its extensive upswing above the bed, lowering again the folders upon the blank folds and then applying the pressing means to squeeze and fix the folds forcibly between the folders and bed, preferably under heat, and with steam moistening action when needed. As an automatic machine there are timed means for performing, in proper sequence, these steps, the final release of pressure being followed by folder outward retraction, permitting at the end of the cycle the removal of the finished blank and the insertion upon the bed of an unfolded one. A manually controlled drive has a stopping action at the cycle end, giving leisure for blank removal and insertion; and preferably also a pause or slowed action at that stage of the cycle wherein the blank is held under hot squeezing pressure so that for difficult kinds of blanks the creasing and fixing action may be prolonged as desired.

Referring to Figs. 40 to 49 the described method and mode of operation are shown in diagram. The letter $d$, with exponents, refers to the die, which has first the vertical or parallel lift and then the upswing; while $f$ refers to the folders, also having vertical movements; both of these instruments having also their horizontal motions; and $s$ represents the steam spray action, on and off. Fig. 40 is a motion diagram wherein along the base each space represents for example 10 degrees of main shaft rotation and upwardly each space represents for example $\frac{1}{16}$ inch. Fig. 41 shows the die upswinging and lowering cam 192 of Fig. 30 etc., with its follower 190 thereon; Fig. 42 the die vertically lifting and lowering cam 199 of Fig. 30 etc., with its follower 198; and Fig. 43 the infolder lifting and lowering twin cams, 284 at the left, 285 at the right, of Figs. 9, 34 etc. with their followers 280; these all being shown in Figs. 41 to 43 as of the start of a cycle, with folders full outward and die full elevated.

The die and infolder and other movements are indicated in suitable order for one cycle in Fig. 40, by full lines for the die, dotted for the folder. At zero time or rotation the expanded die is full elevated, at a point $d'$ above and out of the diagram, indicated as the place of intersection of the left vertical coordinate of the diagram and the descending die line; while the folder, at $f'$, rests at zero level upon the supporting bed. At the base point 50° the die has descended to $d^2$ at zero level, on the blank, where it resides during folding. Fig. 44 shows the die on the way down and Fig. 45 shows it resting on the blank, corresponding with $d^2$. From 50° to 60° the folder lifts 2 units or $\frac{1}{8}$ inch from $f^2$ to $f^3$ to clear the thickness of the die, at which level it remains to $f^6$ or 98°, in the interim having moved inwardly in the part-cycle from $f^4$ to $f^5$. Fig. 46 represents this stage. The time period or 38° angular advance from $f^3$ to $f^6$ clearly affords ample time, for several folders to move inwardly in succession, rather than simultaneously from $f^4$ to $f^5$; and indeed front, rear and end folders could move in three stages or actions if the blank form or corner construction so demanded, each occupying only about 11° of the 38° allowed for this step. Similar remarks apply to the later folder retractions occurring between $f^{13}$ and $f^{16}$ on the diagram.

The diagram references $d$ and $f$ with exponents appear sufficiently in Figs. 41 to 43, and Figs. 44 to 49, to follow the mechanical movements and the cam contours corresponding to the timing diagram; and in the cam diagrams Figs. 41 to 43 appear also designations $a$, $b$ and $c$, with exponents, for the successive cam contour portions respectively, dwells, rises and drops. These diagram features are believed to be clear and readily followed during the description on Fig. 40 of the total cycle, so that the constructor can readily design and produce the cams with the operating contours shown in this example, or other contours for other examples, upon the same principles.

Continuing the description of the illustrative cycle on Fig. 40, the die and the folders next lift slightly vertically relatively to the bed to release frictional pressure between the die and the blank. The folders may start first and lift slight further to avoid interfering with the die lift and to relax friction of the die with the fold as well as with the body of the blank. Thus from $f^6$ at 98° to $f^7$ or 108° the folders may rise 2½ units or $\frac{5}{32}$ inch while from $d^3$ at 102° to $d^4$ at 108° the die rises parallelly 2 units or $\frac{1}{8}$ inch, namely, by the vertical rise of the diehead 164, 165 relatively to the swinghead 166, 167. Fig. 47 shows this stage with the parts at such levels the die next contracts or draws inwardly out of the folds from $d^5$ or 113° to $d^6$ or 128°, with smooth action free of drag upon or disturbance of the fabric of the blank body or infold. Fig. 48 shows this stage.

Continuing the cycle the die may now be swung up and away from the bed, either immediately or after a convenient delay. Specifically the die is shown as being swung upwardly from $d^6$ to a fully upswung position $d^7$ which is beyond the showing of the diagram but at a high level corresponding with the original position $d'$ of the die. At the same time or as soon as the die has been extracted from the folds, the infolders resume their lower level, descending from $f^8$ to $f^9$, being then resting upon the folded blank and therefore slightly above the bed level. Fig. 49 shows this stage. It should be here explained that before the die goes through another cycle it must be restored vertically downwardly by the extent of the parallel lift from $d^3$ to $d^4$, namely by the lowering of the diehead relatively to the swinghead. The parallel lift was performed between $d^3$ and $d^4$, seen also on the cam 199 in Fig. 42, at the cam rise $b$; while at a later point, after the die upswing has begun, the return parallel movement is effected by the cam drop $c$; this motion not appearing on Fig. 40, being absorbed by the general rising upswing of the die, the two motions however being mechanically separate, so that the vertical return motion $c$ could be at any convenient point following the complete extraction of the die from the folds. The parts next come into the pressing stage, for squeezing the folds between the bed and infolders, but in those cases where the creasing is improved by moistening, the spraying or suffusing of the blank is preferably begun or performed before the pressing commences; and this action is indicated on Fig. 40 as performed by the main shaft cam 115 of Figs. 1, 9 and 10, the delivery of steam through the bed into the fabric being indicated on Fig. 40 as commencing at $s'$ or 120° and continuing to $s^2$ or 134°, thus supplying ample moisture for the effective pressing operation immediately to follow.

Continuing the cycle of the diagrams the squeezing pressure is now caused to take effect by the operation of the presser devices 370 which overlie the folder edges and are operated hydraulically by the main shaft cam 350 as seen in Figs. 9, 30 and 39, having a cam rise $350^a$ operating on the follower 351 to supply the hydraulic pressure to operate all of the presser devices, the operation of the cam rise commencing at $f^{10}$ on the motion diagram, operating to thrust the folders downwardly toward the bed, but still slightly thereabove by the amount of the thickness of the blank under the folders, the cam rise being followed by a prolonged dwell $350^b$ which maintains the pressure from $f^{10}$ or 147° on the diagram to $f^{11}$ or 250°. The pressure is then completely relaxed. In a sense the infolders have been sprung downwardly, and may relax upwardly to a slight extent; and at $f^{12}$ or 255° the thin cams 284 and 285 again come into effect, by the cam rise $b^2$, to lift the folders, for example through three units or 3/16 inch, this rise being completed at 265°, at which elevated level the infolders remain for the period from $f^{13}$ to $f^{16}$ at 317°, during which period the infolders are retracted outwardly, for example from $f^{14}$ to $f^{15}$, or by motions distributed in various ways throughout the period $f^{13}$ to $f^{16}$, for example complementarily to the inward movements of the folders between $f^3$ and $f^6$. When the folders have been retracted outwardly, or substantially so, their final descending movement from $f^{16}$ to $f^{17}$ takes place, which is not critical, leaving the folders resting upon the bed at their initial or zero level, where they remain idly to the initial or zero point $f'$, which appears both at the righthand terminus as well as the lefthand commencement of the diagram.

One general characterizing conception in the method and means thus operatively described consists in the cooperating special motions of the die and special motions of the folder set, especially in a combination wherein is an underneath bed and thereabove a set of presser means to depress the folders for completing the work on each blank. A main object is universality of scope of utility, the die and the folders each having adjustability and interchangeability of parts to afford a wide range of use, wherein they operate in a manner complementary to each other; and with the die and folder set so characterized the pressing means cooperates to the same end, consisting as it does of a set of presser devices which are portable and are adjustably attachable in a multitude of ways to the bed to overreach the folders and exert downward thrust upon the folder margins adjacent to the inner or folding edges thereof. Conventional pressing means could not thus function.

It remains to outline in further detail the manner in which the folder set may be subjected to inward and outward folding movements with a substantially universal variety of motions, or combinations of components, in adapting the machine to the many different styles and shapes of blanks which may be presented for folding operations for uses in various arts and industries. The independent timing and adjusting of the transverse in and out movements of the front and rear carriages and the independent timing and adjusting of the longitudinally inward and outward movements of the carrier and supported infolder plates, supported on the respective carriages, have been fully disclosed, these adjustings and timings being usually matters of arranging and setting the several trains of mechanism between the operating cams and the carriages and carriers respectively; and the varied character of the resultant folding and return movements of the folders will now be referred to in connection with the diagram Fig. 15. This diagram is really a collection of three groups X, Y and Z of diagrams.

Referring first to group X of seven separate diagrams $x'$ to $x^7$, these comprise arrows which schematically represent the possible movements of a single one of the folders, of which there may be four, one operating in respect to each of the four quadrants of the folding area over which the folders play. The left front folder of such a complete set-up is assumed, although in the drawings of the machine there are only two folders shown, one working in the left rear and the other in the right rear quadrant. The separate diagrams $x'$ to $x^7$ represent the directions and sequence of motions which may be given to the left front infolder by means of the operating mechanism already described. In each case the arrow or arrows show the direction of the component motions and the numbers show the sequence of the motions or components. Of course each folder in each quadrant can be subjected to these motions, with the directions however varied to suit the quadrant served.

The machine must be able to serve a blank which is to have a single straight fold, the folder working from one direction only, through more complicated tasks, to a blank requiring folds extending into all four quadrants, with folder movements approaching the blank from each side or quadrant. A folder mount or carrier therefore is located in each quadrant, namely, the right front, left front, left back and right back, and each carrier must be capable of moving both longitudinally and transversely, by its own motion and that of its underlying carriage. For complete usefulness the motions given to each carrier must be subject to different timings with respect to other carriers, as to whether they are simultaneous or in sequence. The disclosed machine has independent cams for the front in and out motion, the back in and out motion and the two longitudinal in and out motions, from left and right; although usually the motions from the two ends may be simultaneous and to the same extent of throw, by the central cam 300 of the cluster which includes cams 301 and 302 for the transverse movements at the front and back, the complete timing of the latter two affording all practical combinations. Components in sequence give a total motion in two directions, as at $x^4$ or $x^5$ in diagram group X, while two simultaneous components give a diagonal resultant as at $x^6$, particularly useful for attending to a rounded corner and both adjacent edges. The choice of location for the folders, as for changes of size of a blank, is made possible by reason of the large extent of lengthwise adjustment provided by the setting of the carriers along the lengths of the alining bars which run in the grooves of the carriages, the transverse adjustments being relatively minor in extent. These both are positional adjustments, having no effect upon or connection with the timing and directional adjustments; and it is important that the positional adjustments may be easily made without requiring compensating adjustments to be made in other parts. By splitting in two the cam 300 and its connections the endwise folder movements could be independent and the possible combination multiplied.

The group Y of diagrams in Fig. 15 shows five of the most useful combinations of motions for a set of four or less infolders. In this group the separated diagrams $y'$ to $y^5$ each shows the motions of two front folders, left and right, and two rear folders, left and right. Diagram $y'$ is made up of a combination of motions $x^5$ and $x^6$ of group X, there being two folders with each of these two basic motions. Similarly $y^2$ shows a combination of $x^4$ and $x^6$; while $y^3$ shows a symmetrical combination of four diagonal motions like $x^6$; $y^4$ shows a combination of $x^4$ and $x^5$; and $y^5$ shows a combination of $x^5$, each with successive components, as may be useful for special or lock corners in a blank. These five sets of motions may be reversible as between front and back, to produce additional combinations, with the exception of diagram $y^3$; and thus nine basic combinations are afforded as already stated. Moreover any one of these nine combinations may be again variously modified by the simple omission of one or more of the individual motions or folders, again further increasing the scope. The folder arrangement shown in Fig. 11 may be said to embody the motions of diagram $y^3$, but with the front two folders omitted since the drawing has only two folders, attached in the left and right rear quadrants.

The group Z of diagrams pertains to less usual combinations $z'$ to $z^5$, of limited utility, but showing the great possibilities. Diagram $z'$ shows a combination of motions $x^2$ and $x^3$; $z^2$ shows motion $x'$ for all of the folders; $z^3$ shows motions $x^7$ and $x^6$ at the front and $x'$ at the back; $z^4$ shows motions $x^2$ and $x^4$ at the front and $x^3$ and $x^5$ at the back; and $z^5$ shows motions $x^6$ and $x^7$ at the front, and $x^7$ and $x^6$ at the rear. Of these all but $z^2$ may be reversed back and front; and further any one or more of the various individual folder motions can be omitted from any of these diagrams, by merely disconnecting the connections, or omitting the folders, so greatly increasing the variety. It is clear therefore that very many combinations are possible; and by the addition of special attachments the lengths of motion may be varied, and the slanting angles may be varied differently from 45°, producing hundreds of possible folding combinations and meeting an endless number of special practical situations, in a simple manner, readily practiced in the ordinary industrial plant.

There has thus been described an improvement comprising an infolding method and an infolding machine embodying the principles and attaining the objects of the present invention; but since many matters of operation, combination, mechanism and detail may be variously modified without departing from the principles involved, it is not intended to limit the invention to such matters except to the extent set forth in the appended claims.

What is claimed is:

1. The method of infolding and pressing cloth or like blanks in a machine having a bed to support each blank and a lowerable and liftable die adapted to descend upon and thereby define the blanks resting on the bed and a set of one or more movable folders operable above the bed; such method comprising, placing each blank in position upon the bed, defining the folds to be formed by lowering the die in position upon the blank, and forming the blank margin or margins into folds by moving inwardly the folders over the die edges; characterized by next relieving the blank body of frictional pressure between the bed and the die by slightly lifting the die parallelly from the bed; and then freeing the blank folds from occupation by the die by extracting the die from beneath the blank margins and folders for its extensive uplift above the bed, squeezing and fixing the blank folds by depressing the folders to bear upon the folds and applying high pressure between the folders and bed, and finally releasing the blank for removal by relieving the squeezing pressure and then retracting outwardly the folders.

2. The method of infolding and pressing cloth or like blanks in a machine having a bed to support each blank and a lowerable and liftable die adapted to descend upon and thereby define the blanks resting on the bed and a set of one or more movable folders operable above the bed; such method comprising, placing each blank in position upon the bed, defining the folds to be formed by lowering the die in position upon the blank, and forming the blank margin or margins into folds by moving inwardly the folders over the die edges; characterized by next relieving the blank body and folded margin of frictional pressure between the bed and the die by slightly lifting the die parallelly from the bed and slightly lifting the folders to a greater extent, and then freeing the blank folds from occupation by the die by extracting the die from beneath the blank margins and folders, squeezing and fixing the blank folds by applying high pressure upon the folders near their inner edges to bear upon the folds between the folders and bed, and finally releasing the blank for removal by relieving the squeezing pressure and then retracting outwardly the folders.

3. The method of infolding and pressing cloth or like blanks in a machine having a bed to support each blank and a shiftable die to define the blanks and a set of one or more movable folders; such method comprising, placing each blank in position upon the bed, defining the folds to be formed by lowering the die in position upon the blank, and forming the blank margin or margins into folds by moving inwardly the folders over the die edges; freeing the blank folds from occupation by the die by extracting the die from beneath the blank margins and folders, and then squeezing and fixing the blank folds by depressing the folders to bear upon the folds and apply high pressure between the folders and bed, while maintaining hot the bed to aid fixing the folds, and dampening the blank by a brief spray of steam admitted from below through the bed before the high pressure is applied and cut off before the pressure is released.

4. An automatic infolding machine for cloth and similar blanks having a bed for supporting a blank, a defining die provided with fittings whereby it may be lowered upon and raised away from the bed in each cycle and said die being adapted to be extracted laterally out of the folds, a set of one or more folders provided with fittings whereby they may be moved inwardly to fold the blank margins over the die edge, and pressing means for squeezing the folded blank between bed and folders after extraction of the die; and characterized as follows: said die fittings including an upswingable swinghead upon which the head of the die is mounted for parallel rise whereby the die may bodily rise first vertically or parallelly through a slight distance without swing and thereafter swing up and away to an elevated position giving access to the bed, and said folder fittings including upright guide means whereby the folders may rise and lower through slight distances; and there being actuating means in the nature of cams for the die and infolders pretimed to cause the following cyclic operations: lowering the die to defining position upon the blank positioned on the bed, then moving inwardly the folders over the die edges to form the blank margins into folds, then slightly lifting parallelly the die to relieve frictional pressure of the die upon the blank body, extracting the die from beneath the folders for its extensive upswing above the bed, applying high pressure to squeeze and fix the folds between folders and bed, releasing the pressure, and retracting outwardly the folders from the completed blank.

5. A machine as in claim 4 and wherein is electrical heating means for superheating the bed and folders, and a cooperating means for spraying steam through the bed into the folded blank between bed and folders, with valve controlling the steam passages; and the timed actuating means being operative to cause a brief admission of steam by opening the valve to dampen the blank before the pressure is applied and closing the valve before the pressure is released to permit the heat to dry the folded and pressed blank.

6. In a blank folding machine of the kind described having a die and folders and pressing means, and a main shaft making one turn for each cycle of action of die, folders and pressing means, in combination therewith, a power rotor or pulley, a drive shaft, a clutch interconnected between the rotor and drive shaft, a reduction gearing interconnected between the drive and main shafts, a shipper operable manually and connected to the clutch to close and open the clutch, a drive shaft brake with means whereby it is applied by the shipper when the clutch is opened, a throw-off means or lug mounted on and turning with the main shaft, a shiftable follower adapted to be thrust and displaced by the lug at a predetermined time in the cycle, and a throw-off connection from the follower to the shipper to open the clutch when the lug acts, said connection comprising a yielding part or link permitting manual throw of the shipper to restart the stopped main shaft.

7. A machine as in claim 6 and wherein the yielding throw-off connection is a springy bent link adapted to operate the shipper but to yield by manual or pedal operation for closing the clutch and restarting the drive.

8. In a blank folding machine of the kind described having a main shaft making one turn for each cycle of action of die, folders and pressure squeezing means, a power rotor or pulley, a drive shaft, a clutch between the rotor and drive shaft, a reduction gearing between the drive and main shafts, a shipper operable manually to close and open the clutch, a throw-off means turning with the main shaft and comprising two successive lugs adjustably positionable upon a rotary support on the shaft, a shiftable follower adapted to be thrust and displaced by each lug at a predetermined time in the cycle, and a yieldable connection from the follower to the shipper to open the clutch when each lug acts; one of said lugs being positioned to stop the main shaft and machine at that point in the cycle when the squeezing means is under pressure thereby to prolong the blank fixing action, and the other lug positioned to stop the machine at the cycle end with the die and folders retracted.

9. In a blank folding machine having a bed, a die and folders, and pressure means for squeezing the folded blanks between bed and folders, a blank supporting horizontal bed comprising a steam chest, a bed cover plate thereover, and a flat bed pad smaller than and overlying the cover plate, with steam connections to heat the chest and said superimposed bed elements; and an additional bed heating means comprising controllable electrical heating units adapted to maintain superheat temperatures; said units being in the form of elongated strips, and the bed elements being formed with horizontal ways open at their ends for the reception and removal of such strips without disassembling the bed.

10. A machine as in claim 9 and wherein is means to admit a brief spray or portion of steam to the space between the bed pad and folders to moisten the blank fabric for improving the pressing of the folded edges, comprising steam pipes and passages leading thereto, a valve to admit and cut off steam flow therethrough, and a timing means to open and close the valve after the folds have been formed and before the release of the squeezing pressure therefrom.

11. In a blank folding machine having a bed, a die and folders, and pressure means for squeezing the folded blanks between bed and folders, a blank supporting horizontal bed comprising a steam chest, a bed cover plate thereover, and a flat bed pan smaller than and overlying the cover plate, with steam connections to heat the chest and said superimposed bed elements, with an additional bed heating means comprising controllable electrical heating units adapted to maintain superheat temperatures of the bed and folders; and means to admit sprays of steam to the folded blank edges while confined between the bed pad and folders, comprising a valved steam supply pipe and passages formed in the bed, extending up through the cover plate to the underside of the pad, the pad being formed with interior distributing passages and with upwardly delivering nozzles extending from the distributing passages.

12. An automatic infolding machine having a bed for supporting a blank, a defining die fitted to be swingingly lowered upon the bed in each cycle and constructed to be contracted out of the folds, a set of folders fitted to be moved inwardly to fold the blank margins over the die edge, and pressing means for squeezing the folded blank between bed and folders after extraction of the die; and characterized in that the die body is formed with a set of ways including diagonal ways for sliding shoes, with underneath carriers attached to said shoes and therefore slidable in and out, the carriers having recessed grooves for the adjustable mounting of shanks therein, defining blades with upstanding shanks whose tops fit solidly in said carrier grooves, and screw clamps for securing the shank tops in said grooves; linkage connections atop the die body from the several carrier shoes to a fore-and-aft sliding sliderbar adapted to effect contraction and expansion movements of the carriers and blades, and a cyclic cam having timed connections to said slidebar, including a means of adjustment of the expanded position of the die blades and a means of adjustment of the extent of throw thereof.

13. The machine as in claim 12 and wherein the shoes and carriers include diagonally movable shoes and carriers at the corners and straightly movable shoes and carriers at other sides, with slidable alining bars engaging grooves in the carriers; there being holders upon which the die blades are interchangeably attached and the shanks of which holders are clampable to the carriers.

14. An automatic infolding machine having a bed for supporting a blank, a defining die fitted to be swingingly lowered upon the bed in each cycle and constructed to be contracted out of the folds, a set of folders fitted to be moved inwardly to fold the blank margins over the die edge, and pressing means for squeezing the folded blank between bed and folders after extraction of the die; and characterized in that the die has its head mounted for bodily lift, first slightly parallelly to relax friction before extraction from the folds, and then swingingly extensively up and away from the bed; there being a swinging arm with a swinghead at its free end and the diehead being mounted dependingly beneath the swinghead by a vertical slide connection as a sleeve and rod; and a limiting means for the gravity descent of the diehead, comprising a stop member or finger on the diehead bearing down upon an abutment member on the swinghead; with timed means for lifting slightly the diehead relatively to the swinghead and bed, followed by upswinging of the arm, swinghead and diehead.

15. A machine as in claim 14 and wherein between the stop member and abutment is an adjusting contact screw operable to set the lowered position of the die relatively to the bed.

16. A machine as in claim 14 and wherein the diehead vertical lifting means comprises the abutment, and means mounting it to swing to elevate the stop member and die, with an operating extension for swinging the abutment by said timed means.

17. A machine as in claim 14 and wherein is a cyclic cam affording timed actuation, a second cam movable to swing the pivoted abutment, a wedge means between the swingarm and the abutment, a connection from the cyclic cam to the second cam, and a connection from the second cam to the wedge means.

18. A machine as in claim 14 and wherein for the die upswing it is provided with a rear-extending toe, and means to pull down the toe to lift the die arm comprising a loose radius arm coaxial with the die swing and having a projection overlying the toe, and a drawbar pulled frontwardly by a cam to swing the radius arm and toe and lift the die; whereby the swing arm and die may be freely lifted and swung over back to rest inoperative on a fixed stop.

19. A machine as in claim 14 and wherein the abutment on the swinghead is pivoted for swinging motion and has an extension for effecting its swinging, and wherein is a cyclic cam and connections therefrom affording timed actuation, such connections comprising a second cam movable to swing the pivoted abutment by swinging its extension from and toward the swingarm; and wherein is means to adjust the extent of the second cam action and other means to adjust the initial position of the extension and the abutment.

20. An automatic infolding machine having a bed for supporting a blank, a defining die with a head fitted to a swinging arm to be lowered upon the bed in each cycle and constructed to be contracted out of the folds, a set of one or more folders fitted to be moved inwardly to fold the blank margins over the die edge, and pressing means for squeezing the folded blank between bed and folders after extraction of the die; said machine being characterized in that the die has its head fitted to said arm and adapted for bodily lift, first parallelly to a slight extent relatively to the arm to relax friction between die and blank before extraction from the folds, and then swingingly with said arm extensively up and away from the bed; said swinging arm having a swinghead at its free end and the diehead being mounted dependingly from the swinghead with relative up and down movement for the aforesaid slight parallel lift; and with timed means for lifting slightly the diehead relatively to the swinghead and bed, followed by upswinging of the arm, swinghead and diehead, and vice versa.

21. A machine as in claim 20 and wherein as a means of predetermining the limit of descent of the diehead and die relatively to the swinghead is an abutment member on the swinghead and a stop member on the diehead bearing down on the abutment member, with a mechanical adjusting device for adjusting one of said members relatively to the other.

22. An automatic infolding machine having a bed for supporting a blank, a defining die fitted to be swingingly lowered upon the bed in each cycle and to be extracted out of the folds, a set of folders fitted to be moved inwardly to fold the blank margins over the die edge, and pressing means for squeezing the folded blank between bed and folders after extraction of the die; and characterized in that there are front and rear carriers and that each folder is mounted on a carrier, front or rear, and all the front carriers are mounted for in and out longitudinal sliding movements on a front carriage and the rear carriers on a rear carriage; and the carriages are each mounted floatingly for in and out transverse movements upon and with shoe members and for independent up and down movements relatively to the shoe members, the shoe members being mounted for transverse in and out movements on the machine frame; and timed means and connections for effecting transverse movements of the shoe members and carriages, vertical movements of the carriages and carriers and longitudinal movements of the carriers and folders, in coordination.

23. A machine as in claim 22 and wherein are clip means for quick detachment and interchange of each folder upon a carrier, comprising studs upstanding from the carrier each extending through an aperture in the folder, a spacer associated with the stud to hold the folder spaced above the carrier, the stud having a groove above the folder, and a clip piece engageable with the stud groove to confine and lock the folder upon the carrier.

24. An automatic infolding machine having a bed for supporting a blank, a die fitted to be lowered upon the bed in each cycle and to be extracted out of the folds, and a set of folders fitted at the same level to be moved inwardly to fold the blank margins over the die edge, and means for squeezing the folded blank between bed and folders after extraction of the die; and characterized by the following folder mountings: a set of carriers in the four quadrants of the machine, namely, front left and right, and back left and right, upon which the folders are mounted to receive their in and out motions, front and back carriages upon which the corner carriers are mounted slidingly for in and out longitudinal movements thereon, trucks upon which the carriages are mounted for simultaneous up and down movements thereon, the trucks being mounted for transverse in and out sliding movements on the machine frame; and timed means and connections for effecting transverse in and out movements of the trucks and carriages, vertical movements of the carriages and carriers and longitudinal in and out movements of the carriers and folders, in coordination.

25. A machine as in claim 24 and wherein are separate cyclic cams for (1) the transverse in-and-out movements of the folders mounted at the front (2) the transverse movements of the folders mounted at the back and (3) the longitudinal movements of the folders at the left and right ends; whereby the individual folders may be given universal and independent motions, simple or combination, successive or with diagonal resultants.

26. A machine as in claim 24 and wherein the carriers are mounted on the front and back carriages by way and rib mountings, with separate longitudinal bars to which the left and right carriers on each carriage are attached, and linkage connections from a cyclic cam to said carrier bars; and means for adjusting and setting the positions of the respective carriers on the bars in accordance with the shape and size of the blank.

27. A machine as in claim 24 and wherein each carriage is mounted at longitudinally spaced points upon two trucks by underside ways in the carriage engaged with upstanding shoes on the trucks permitting and guiding the vertical carriage motions, while each truck has a slider extension playing fore-and-aft in a way formed in a frame part.

28. A machine as in claim 27 and wherein for each truck is means for fore-and-aft adjustment between the cam and truck to predetermine the transverse position of the truck; whereby the several trucks may be initially set to bring the carriages into parallelism.

29. A machine as in claim 24 and wherein each carriage is mounted at longitudinally spaced points upon two of such trucks by means of underside ways or grooves in the carriage engaged with upstanding shoes on the trucks such engagement being an upright sliding engagement permitting and guiding in fore-and-aft directions the vertical carriage motions, while each truck has a slider extension or stem playing fore-and-aft in a way formed in a frame part or wall; and wherein the several trucks, front and back, left and right, have contact surfaces or shoulders adapted to take the weight of the front and back carriages when lowered, and of the carriers and folders superimposed thereon.

30. A machine as in claim 24 and wherein each of the front and back carriages is confined against longitudinal play while free for transverse and vertical motion, and each carriage for its vertical motion has a pair of spaced lugs, and there is provided a lifting member or toe for each lug, with cyclic cam means and connections to operate said lifting means in unison for vertical parallel lift of both carriages, the superposed carriers and all of the folders, in coordination with the longitudinal and transverse in-and-out movements; such lifting means during lifting and lowering taking the weight of the carriages and supported parts.

31. A machine as in claim 24 and wherein between the cam means and carriages are adjusting means (1) for initial setting of the two carriages in horizontal positions at the same levels and (2) for predetermining the extent of lift of the carriages.

32. A machine as in claim 24 and wherein the front and back trucks or shoe members have operating connections from cyclic cams, separate for the front and back, and comprising a cam-swung lever giving fore-and-aft motions to the trucks and carriages and a universal joint between each such lever and the truck operated thereby.

33. A machine as in claim 24 and wherein on a cyclic shaft are three cams, for effecting longitudinal in-and-out movements of carriers and folders, for effecting transverse in-and-out movements of the front carriage and supported carriers and folders, and for effecting transverse movements of the back carriage and supported carriers and folders; said cams being arranged adjacently in a cluster and being relatively adjustable in rotary manner to vary at will the order of motion components for the respective folders in the four quadrants of the machine, with means for securing together the cams in various adjusted relations.

34. An automatic infolding machine having a central bed with a smaller overlying pad for supporting a blank, a defining die adapted to be lowered upon the pad in each cycle and to be extracted out of the folds, a set of folders adapted to be moved inwardly above the pad to fold the blank margins over the die edges and having vertical play, and pressing means for squeezing the folded blank by depression of the folders after extraction of the die; said folders having mountings rendering them readily adaptable to an extensive variation of shapes and sizes by interchange or by adjustment in relation to such mountings; and said pressing means comprising a system of separate portable presser devices independently locatable and removably mountable upon the bed outside of the folders and pad, each device having a base and movable thereon, a press-arm extendable inwardly to overreach a folder and carrying a depressing finger adapted to contact and bear down upon the inner margin of a folder, a motor provided for each device operable to cause depression of its arm and finger, the motors of the respective devices having flexible connections from a remote power source serving all of the devices, and a timed means or cam to operate the power source to operate all the presser devices at a time when the folders overlie the unoccupied folds of the blank.

35. A machine as in claim 34 and wherein each presser motor is hydraulic, comprising a piston and cylinder, and the flexible connections are tubes carrying liquid, and the remote power source is a hydraulic pump, connected to operate through said tubes a plurality of said hydraulic motors.

36. A machine as in claim 34 and wherein is a common hydraulic pump and the several presser motors are equivalent hydraulic motors adapted to deliver equal depression force to all the folders, for that purpose having interconnected flexible connections, serving all of said hydraulic presser motors from said common pump.

37. An automatic infolding machine having a central bed for supporting a blank, a defining die adapted to be extracted out of the folds, folders adapted to be moved inwardly to fold the blank margins over the die edges, and pressing means for squeezing the folded blank by depression of the folders; said folders having mountings rendering them universally adaptable to an extensive variation of shapes and sizes; and said pressing means comprises separate portable presser devices independently locatable and readily mountable and demountable outside of the folders, each device having a mounting base and an arm extendible inwardly to overreach a folder and there carrying a depressing finger adapted to bear down upon the inner margin of a folder, a motor for actuating each device operable to cause depression of its finger, the motors of the respective devices having flexible connections from a remote power source serving all of the devices, and timed means to operate the power source to operate all the presser devices at a time when the folders overlie the unoccupied folds of the blank.

38. For an automatic infolding machine having a central bed for supporting a blank, a defining die adapted to be extracted out of the folds, folders mounted and operable to be moved inwardly to fold the blank margins over the die edges, and pressing means for squeezing the folded blank by depression of the folders after extraction of the die; and said pressing means comprising separate portable presser devices independently locatable and readily mountable on and demountable from the bed outwards of the folders, each device having a mounting base and an arm extendible inwardly to over-reach a folder and there carrying a depressing finger adapted to bear down upon the inner margin of a folder, a motor for actuating each device operable to cause depression of its finger, the motors of the respective devices having flexible connections from a remote power source serving all of the devices, and timed means to operate the power source to operate all the presser devices at a time when the folders overlie the unoccupied folds of the blank.

39. A machine as in claim 38 and wherein the flexible connections are interconnected to give substantial equalization of action and squeezing pressure by all folders.

40. A machine as in claim 38 and wherein the presser motors are hydraulic, the flexible connections are liquid conduits and tubes, and the remote power source is a liquid pump operated with timed coordination in each cycle.

41. A machine as in claim 38 and wherein the overreaching arm of each presser device is a lever arm swingable downwardly to depress the folder; the device having a second lever arm extending outwardly, such two-arm lever being centrally pivoted on the base, and the motor being arranged to thrust upwardly on the outward arm to rock the lever, with the bed as an abutment.

42. A machine as in claim 38 and wherein the presser device base is anchored to the bed as follows: the base being provided with a vertical mounting bolt threaded at its lower end, and the bed at convenient places being formed with recesses and threaded means to receive the bolts; the devices being swingable about their bolts to various positions.

43. A machine as in claim 38 and wherein the presser device base is anchored to the bed as follows: the base being provided with a vertical mounting bolt threaded at its lower end, and the bed at convenient places being formed with undercut grooves to contain threaded blocks shiftable adjustably therein and adapted to receive such bolts.

44. For an automatic infolding machine having a central bedplate with a smaller pad thereon for supporting a blank, a defining die adapted to be extracted out of the folds, folders mounted outwards of the bed and operable over the pad to fold the blank margins over the die edges, said folders having vertical play for depression at their inner edges, and pressing means for squeezing the folded blank by depression of the folders after extraction of the die; said pressing means comprising separate portable presser devices independently locatable and having attachers for mounting them upon the bed outwards of the folders and pad, each device having a mounting base and a swingable lever arm extendible inwardly to overreach a folder and there adapted to bear down upon the inner margin of a folder, and a motor for actuating each device operable to cause depression of its finger, the motors of the respective devices having flexible connections from a remote power source serving all of the devices.

ALFRED G. GILBERT.
WILLIAM H. ROGERS, Jr.

REFERENCES CITED

The following references are of record in the file of this patent:

UNITED STATES PATENTS

| Number | Name | Date |
|---|---|---|
| 956,950 | Dixon | May 3, 1910 |
| 1,086,419 | Tucker | Feb. 10, 1914 |